United States Patent
Yavuz et al.

(10) Patent No.: US 8,989,794 B2
(45) Date of Patent: Mar. 24, 2015

(54) METHOD AND APPARATUS FOR UNPLANNED DEPLOYMENT OF BASE STATIONS

(75) Inventors: Mehmet Yavuz, San Diego, CA (US); Matt Stuart Grob, San Diego, CA (US); Varun Khaitan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 13/526,846

(22) Filed: Jun. 19, 2012

(65) Prior Publication Data

US 2013/0157650 A1    Jun. 20, 2013

Related U.S. Application Data

(60) Provisional application No. 61/498,968, filed on Jun. 20, 2011.

(51) Int. Cl.
| | |
|---|---|
| *H04B 7/00* | (2006.01) |
| *H04W 52/26* | (2009.01) |
| *H04W 24/02* | (2009.01) |
| *H04W 16/16* | (2009.01) |
| *H04W 24/10* | (2009.01) |
| *H04W 84/04* | (2009.01) |

(52) U.S. Cl.
CPC .............. *H04W 52/26* (2013.01); *H04W 24/02* (2013.01); *H04W 16/16* (2013.01); *H04W 24/10* (2013.01); *H04W 84/045* (2013.01)
USPC ............. 455/522; 455/517; 455/69; 455/450; 455/464; 455/509

(58) Field of Classification Search
CPC ..... H04W 16/16; H04W 24/02; H04W 24/10; H04W 52/26; H04W 84/045; H04W 52/34; H04W 52/18; H04W 52/262; H04W 52/265
USPC ................... 455/522, 517, 69, 450, 464, 509; 370/329, 431, 341
See application file for complete search history.

(56) References Cited

U.S. PATENT DOCUMENTS

2008/0165727 A1 *   7/2008   Xiaoben et al. .............. 370/329
2009/0296635 A1    12/2009   Hui et al.
(Continued)

FOREIGN PATENT DOCUMENTS

| EP | 2107840 A2 | 10/2009 |
|---|---|---|
| JP | 2010093657 A | 4/2010 |
| JP | 2011120095 A | 6/2011 |

OTHER PUBLICATIONS

International Search Report and Written Opinion—PCT/US2012/043395—ISA/EPO—Oct. 4, 2012.

*Primary Examiner* — Khai M Nguyen
(74) *Attorney, Agent, or Firm* — Fariba Yadegar-Bandari

(57) ABSTRACT

Methods and apparatuses are provided that include deploying a femto node in a wireless network. The femto node can measure received signal quality upon initialization in a wireless network and/or according to a timing. The femto node can determine whether to communicate in the wireless network based on comparing the received signal quality to a threshold signal quality. The timing can be determined based on various factors to ensure fairness among femto nodes initializing in the wireless network. A centralized entity can be used to determine the timing and/or whether a femto node should communicate.

39 Claims, 16 Drawing Sheets

(56) References Cited

U.S. PATENT DOCUMENTS

| | | |
|---|---|---|
| 2009/0325625 A1 | 12/2009 | Hugl et al. |
| 2010/0118844 A1* | 5/2010 | Jiao et al. ............... 370/338 |
| 2010/0248762 A1 | 9/2010 | Erceg et al. |
| 2010/0273432 A1 | 10/2010 | Meshkati et al. |
| 2010/0290355 A1* | 11/2010 | Roy et al. ............... 370/252 |
| 2010/0322227 A1 | 12/2010 | Luo |
| 2011/0086641 A1 | 4/2011 | Guvenc et al. |
| 2011/0222484 A1* | 9/2011 | Pedersen et al. ............... 370/329 |
| 2011/0319084 A1 | 12/2011 | Meshkati et al. |
| 2012/0108239 A1* | 5/2012 | Damnjanovic et al. ....... 455/436 |
| 2012/0163309 A1* | 6/2012 | Ma et al. ............... 370/329 |
| 2013/0157650 A1* | 6/2013 | Yavuz et al. ............... 455/422.1 |

* cited by examiner

METHOD AND APPARATUS FOR UNPLANNED DEPLOYMENT OF BASE STATIONS

CLAIM OF PRIORITY UNDER 35 U.S.C. §119

The present Application for Patent claims priority to Provisional Application No. 61/498,968, entitled "METHOD AND APPARATUS FOR UNPLANNED DEPLOYMENT OF FEMTOCELLS" filed Jun. 20, 2011, assigned to the assignee hereof and hereby expressly incorporated by reference herein.

BACKGROUND

1. Field

The following description relates generally to wireless network communications, and more particularly to deployment of low power base stations in a wireless network.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. Such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection. Because deployment of such base stations is unplanned, low power base stations can interfere with one another where multiple stations are deployed within a close vicinity of one another.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with determining whether to transmit from a low power base station, and/or a power for transmitting from the low power base station, based on measuring signal quality received at the low power base station. In this regard, in one example, substantial interference to one or more other base stations can be avoided by not allowing the low power base station to transmit where the received signal quality is over a threshold. Comparing measured signal quality to the threshold and/or accordingly setting a transmit power or determining whether to transmit can be performed by the low power base station (e.g., in collaboration with one or more other low power base stations or otherwise), by a centralized entity communicating with a plurality of low power base stations, and/or the like. Moreover, in an example, calibration among low power base stations can be periodically performed in a round robin manner to ensure that substantially all associated low power base stations have an opportunity to transmit over a given period of time.

According to an aspect, a method for deploying a femto node in a wireless network is provided. The method includes determining a timing for measuring a received signal quality in the wireless network and measuring the received signal quality based on the timing. The method further includes determining whether to communicate in the wireless network based in part on comparing the received signal quality to a threshold signal quality.

In another aspect, an apparatus for deploying a femto node in a wireless network is provided. The apparatus includes at least one processor configured to determine a timing for measuring a received signal quality in the wireless network and measure the received signal quality based on the timing. The at least one processor is further configured to determine whether to communicate in the wireless network based in part on comparing the received signal quality to a threshold signal quality. The apparatus further includes a memory coupled to the at least one processor.

In yet another aspect, an apparatus for deploying a femto node in a wireless network is provided. The apparatus includes means for determining a timing for measuring a received signal quality in the wireless network and measuring the received signal quality based on the timing. The apparatus further includes means for determining whether to communicate in the wireless network based in part on comparing the received signal quality to a threshold signal quality.

Still, in another aspect, a computer-program product for deploying a femto node in a wireless network is provided including a non-transitory computer-readable medium having code for causing at least one computer to determine a timing for measuring a received signal quality in the wireless network and code for causing the at least one computer to measure the received signal quality based on the timing. The computer-readable medium further includes code for causing the at least one computer to determine whether to communicate in the wireless network based in part on comparing the received signal quality to a threshold signal quality.

Moreover, in an aspect, an apparatus for deploying a femto node in a wireless network is provided that includes a parameter measuring component for determining a timing for measuring a received signal quality in the wireless network and measuring the received signal quality based on the timing. The apparatus further includes a transmit determining component for determining whether to communicate in the wireless network based in part on comparing the received signal quality to a threshold signal quality.

According to a further aspect, a method for deploying a femto node in a wireless network is provided. The method includes determining a timing for a femto node to measure received signal quality in the wireless network to determine whether to communicate. The method further includes commanding the femto node to measure received signal quality based on the timing.

In another aspect, an apparatus for deploying a femto node in a wireless network is provided. The apparatus includes at least one processor configured to determine a timing for a femto node to measure received signal quality in the wireless network to determine whether to communicate. The at least one processor is further configured to command the femto node to measure received signal quality based on the timing. The apparatus further includes a memory coupled to the at least one processor.

In yet another aspect, an apparatus for deploying a femto node in a wireless network is provided. The apparatus includes means for determining a timing for a femto node to measure received signal quality in the wireless network to determine whether to communicate. The apparatus further includes means for commanding the femto node to measure received signal quality based on the timing.

Still, in another aspect, a computer-program product for deploying a femto node in a wireless network is provided including a non-transitory computer-readable medium having code for causing at least one computer to determine a timing for a femto node to measure received signal quality in the wireless network to determine whether to communicate. The computer-readable medium further includes code for causing the at least one computer to command the femto node to measure received signal quality based on the timing.

Moreover, in an aspect, an apparatus for deploying a femto node in a wireless network is provided that includes a transmit parameter determining component for determining a timing for a femto node to measure received signal quality in the wireless network to determine whether to communicate. The apparatus further includes a transmit parameter indicating component for commanding the femto node to measure received signal quality based on the timing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
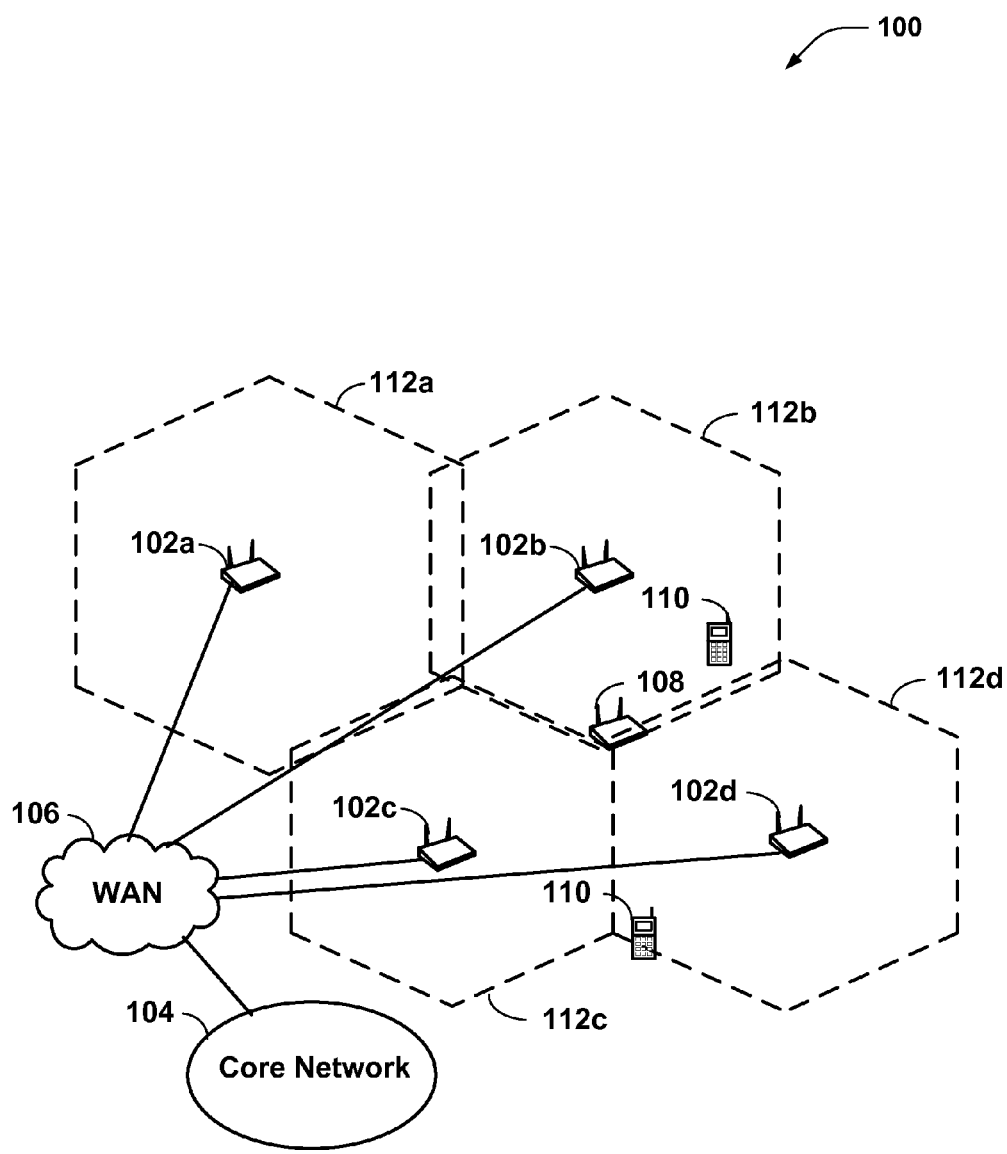
FIG. 1 is a block diagram of an example wireless communication system employing femto nodes to communicate in a wireless network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, low power base stations, such as femto nodes, can measure one or more parameters of a wireless network environment to determine whether to transmit in the wireless network. For example, a femto node can measure a signal quality of one or more signals received from one or more other nodes against a threshold to determine whether providing wireless service at the femto node might cause additional interference to the one or more other nodes or devices communicating therewith. In one example, the threshold can be configured or otherwise determined based at least in part on one or more aspects of the wireless network environment. The measured signal quality can be a received signal strength indicator (RSSI), received signal code power (RSCP), a pilot energy (Ecp), signal-to-noise ratio (SNR), total received power-to-interference ratio (Ecp/Io), and/or similar signal quality or power parameters of the one or more other nodes.

In another example, a centralized entity, which can be another femto node, femto node gateway, etc., can receive signals measurements from the femto node for determining whether to allow one or more femto nodes to provide wireless service. Since deployment of such access points is typically unplanned, such regulation of access points providing wireless service can mitigate over-saturation of access points in an area while providing desirable wireless service coverage. In one example, however, this may result in one or more femto nodes lacking any transmission opportunities where the one or more femto nodes enter the wireless network while one neighboring femto nodes have established a transmit power, and the one or more femto nodes determine that the signal quality is over the threshold. In this regard, for example, the femto nodes can calibrate power in a round robin manner where one or more femto nodes that have transmitted in previous time periods can be powered down or otherwise set to refrain from transmitting in a subsequent time period to allow other femto nodes to measure signal quality below a threshold and accordingly transmit.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a macro base station associated with a wireless wide area network (WWAN). As such, the coverage area of the low power base station can be substantially smaller than the coverage area of a macro base station.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an exemplary autonomously controlled wireless communications system 100 is illustrated including a plurality of femto nodes 102a-d, or other low power base stations, in communication with an operator core network 104 via a WAN 106. Femto nodes 102a-d may include relatively low power equipment, as described, and may not be provided with a conventional transmission tower. Each femto node 102a-d may be installed and activated in arbitrary chronological order, at an unplanned location. For example, a network operator may provide femto nodes to various different third parties. While the network operator may install and operate some femto nodes in the system 100, each femto node may be autonomously controlled as described herein, and can be added and removed from the system 100 in a flexible, ad-hoc manner.

Each of the activated femto nodes 102a-d may provide service to UEs, such as UEs 110, located within corresponding coverage areas 112a-d. For example, a coverage area 112a may be provided by femto node 102a, and so forth. It should be appreciated that coverage areas 112a-d may not have a regular or uniform geometrical shape, and may vary in shape and extent based on local factors such as topology of the landscape and the presence or absence of blocking objects in an area. For example, the femto nodes 102a-d can initialize transmit power to establish coverage areas 112a-d, which can be performed based on a fixed transmit power or a transmit power received in a configuration, a transmit power adjusted based on a determined radio environment, and/or the like.

Femto node 108 can be deployed within the existing network including femto nodes 102a-d. Upon powering on or as part of initialization or other procedure at femto node 108, the femto node 108 can determine whether to transmit in the wireless communication system 100, and/or a power at which to transmit, based on measuring a received signal power or quality. This measurement can be performed over one or more channels the femto node 108 plans to utilize in communicating in the wireless communication system 100. In one example, femto node 108 can compare the received signal quality to a threshold; where the received signal quality is over the threshold (e.g., and/or equal to the threshold), femto node 108 can refrain from transmitting. Where the received signal quality is below the threshold (e.g., and/or equal to the threshold), femto node 108 can transmit and/or select a transmit power relative to the received signal quality. In this regard, where the received signal quality is over a threshold, femto node 108 can avoid interfering with femto nodes 102a-d (or more likely neighboring femto nodes 102b-d) as part of powering on or initializing in a wireless network.

In one example, at least where the femto node 108 determines not to transmit in the wireless network, femto node 108 can periodically perform the signal quality measurements and subsequent transmit determination to account for any changes in the network environment (e.g., powering off or reduced transmit power of one or more of femto nodes 102b-d, and/or the like). Moreover, in an example, a centralized entity can perform one or more of the described functions. For instance, femto node 108 can perform the signal quality measurements and report to the centralized entity (e.g., in core network 104 or WAN 106), which can determine whether the femto node 108 can transmit (and/or a transmit power therefor) based on the signal quality measurements, signal quality measurements performed by other neighboring femto nodes, and/or the like. In addition, the centralized entity can obtain and utilize additional measurements, such as loading, location, neighbor cell information, and/or the like, as received from femto nodes 102b-d and/or 108, to determine whether femto node 108 can transmit (and/or a transmit power for femto node 108).

Furthermore, in an example, transmit power can be determined by or otherwise assigned to femto nodes 102b-d and 108 in a round robin manner to allow femto node 108 to transmit where the signal quality measured by femto node 108 is constantly greater than the threshold. In this example, a centralized entity that communicates with at least femto nodes 102b-d and 108, and/or one or more of the femto nodes 102b-d and 108 themselves, can ensure that all associated femto nodes are at least able to measure signal quality below the threshold and thus transmit in a given period of time. Thus, for example, where femto node 108 continually determines the signal quality is over the threshold, one or more of femto nodes 102b-d can reduce transmit power or otherwise refrain from transmitting for a period of time to allow femto node 108 to determine the signal quality is under the threshold and accordingly transmit in wireless communication system 100. In another example, the femto nodes 102b-d and 108 can periodically calibrate transmit power and/or whether to transmit at different timing offsets to ensure fairness in determining which femto nodes transmit in a given time period. In either case, the command to reduce transmit power or otherwise refrain from transmitting can come from the corresponding femto node 102b-d or the centralized entity.

Figure 2:
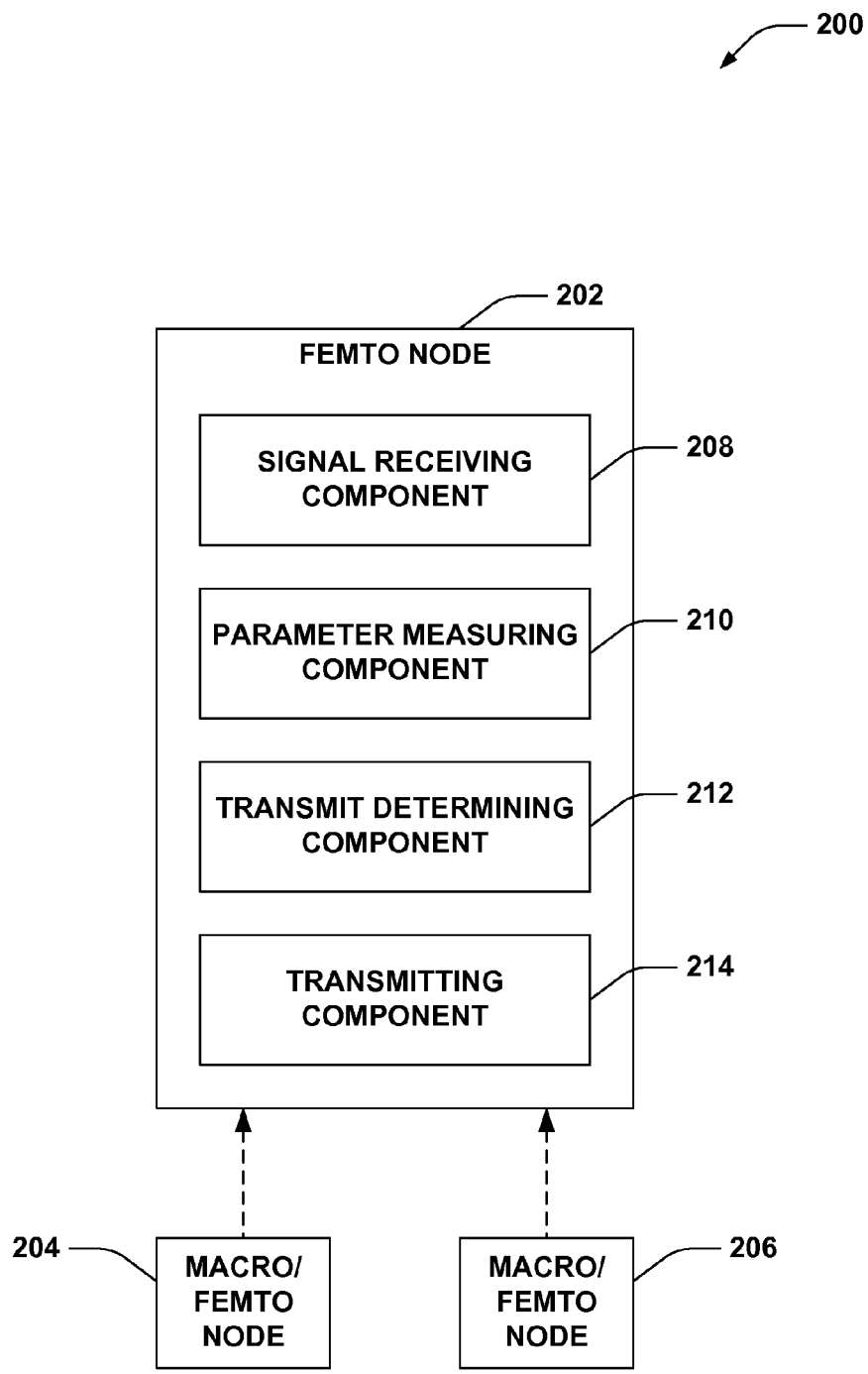
FIG. 2 is a block diagram of an example wireless communication system for determining whether to communicate based on received signal quality.

Turning to FIG. 2, an example wireless communication system 200 is illustrated for determining whether to provide service in a wireless network based on signals from one or more nodes. System 200 includes a femto node 202, as well as macro/femto nodes 204 and 206. Femto node 202, as described, can be substantially any low power base station, device, and/or the like. In addition, macro/femto nodes 204 and 206 can each be a low power base station, such as a femto node, pico node, micro node, etc., a macro node, a device (e.g., communicating in peer-to-peer pr ad-hoc mode with other devices), a relay node, and/or the like.

Femto node 202 includes a signal receiving component 208 for obtaining one or more signals in a wireless network, and a parameter measuring component 210 for determining one or more parameters related to the one or more signals. Femto node 202 also includes a transmit determining component 212 for deciding whether to provide service in the wireless network by transmitting one or more signals based at least in part on the one or more parameters (and/or a power for transmitting such signals), and a transmitting component 214 for communicating in the wireless network.

According to an example, macro/femto nodes 204 and 206 can be deployed in the wireless network, and can transmit signals to advertise wireless service to one or more devices (not shown) and/or to otherwise communicate therewith. Macro/femto nodes 204 and 206 can operate in a channel dedicated for such wireless service (e.g., in a similar frequency space) such that additional communications over the channel may cause interference thereto. In this example, femto node 202 can be deployed within a vicinity of macro/femto nodes 204 and 206, and can thus detect signals therefrom. For example, signal receiving component 208 can receive signals from macro/femto nodes 204 and/or 206, devices communicating therewith, etc., and parameter measuring component 210 can determine one or more parameters related to the signals. Transmit determining component 212, as described, can compare the one or more parameters to one or more thresholds to determine whether femto node 202 should also provide service in the wireless network. Transmitting component 214 can accordingly transmit or refrain from transmitting signals related to providing wireless service.

In a specific example, signal receiving component 208 can receive signals over a frequency range within which the femto node 202 intends to communicate. This can include receiving signals from macro/femto nodes 204 and 206 and/or other nodes or devices communicating therewith. Parameter measuring component 210 can measure a signal quality over the frequency range based in part on the received signals. For example, this can include measuring an RSSI, Ecp, Ecp/Io, SNR, and/or the like, as related to the received signals. Transmit determining component 212 can compare the signal quality measurement to a threshold. Where the signal quality is over the threshold, this can indicate that allowing femto node 202 to communicate in the network may cause additional undue interference in the wireless network.

For example, the threshold can be configured by or otherwise received by femto node 202 (e.g., from a node of a core wireless network). The threshold can relate to a location of deployment for femto node 202, in one example. For instance, where femto node 202 is deployed in an urban area, the threshold can be lower than for a suburban area because the femto node 202 likely competes with more femto nodes in a shorter distance. In this regard, transmit determining component 212 can obtain the threshold from a wireless network component provisioned based on a reported location of femto node 202. In other examples, transmit determining component 212 can set or otherwise select the threshold based on the measured signal quality, a number of signals differentiated over the wireless channels (e.g., which can indicate a number of neighboring femto nodes), a strength determined of each of such signals, a determined or received density of femto nodes within a specific geographic location range, a number of devices communicating with neighboring femto nodes or other received or determined loading information, and/or the like. In other examples, the threshold can be operator or user specified based on inputting the threshold, a parameter from which the threshold can be determined (e.g., location or a description thereof), and/or the like.

In any case, transmit determining component 212 can discern whether to provide service in the wireless network based at least in part on the comparison of the measured signal quality to the threshold. For example, where the measured signal quality is below the threshold, transmit determining component 212 can determine that femto node 202 can transmit in the wireless network without causing significant interference. In this example, transmitting component 214 can so transmit signals to advertise or otherwise provide wireless service, can select a transmit power relative to the measured signal quality (e.g., and or a difference between the measured signal quality and the threshold), etc. Where the measured signal quality is above a threshold, however, transmit determining component 212 can determine that the femto node 202 is not to provide service in the wireless network due to possible interference to one or more other nodes, as described.

In one example, as described, parameter measuring component 210 can perform RSSI, RSCP, SNR, Ecp/Io, or similar quality or power measurements of the received signals for comparing to the threshold. In another example, signal receiving component 208 can obtain pilot signals from macro/femto nodes 204 and 206 (e.g., and/or other nodes). In this example, parameter measuring component 210 can determine an Ecp of the pilot signals, which can indicate a pathloss to macro/femto nodes 204 and 206 (e.g., and/or other nodes). Thus, transmit determining component 212 can analyze the Ecp of the pilot signals compared to a threshold to determine at least one of whether one or more nodes are within a close range of femto node 202, a number of one or more nodes within the range of femto node 202, etc. For example, transmit determining component 212 can determine whether to provide service in the wireless network based at least in part on determining whether one or a threshold number of nodes are within the range of femto node 202. Where the number of nodes within range are below the threshold, for example, transmit determining component 212 can determine to provide wireless network service. The threshold Ecp and/or number of nodes threshold can be received in a hardcoding, configuration, etc., determined based at least in part on one or more parameters of a wireless network environment, and/or the like, as described above with respect to the signal quality threshold.

In another example, parameter measuring component 210 can determine Ecp or other measurements of a subset of received signals in determining whether to transmit in the wireless network. For example, parameter measuring component 210 can determine which of the signals relate to certain macro/femto nodes (e.g., femto nodes advertising an open or hybrid access mode, as opposed to a closed access mode), and can use a combined or average quality of the signals for comparing to the threshold. It is to be appreciated, in this example, that femto nodes can operate in an open access mode where substantially any UE is allowed access to the femto node, a closed access mode where only some UEs are allowed to access the femto node (e.g., UEs in a closed subscriber group (CSG), as described further herein), or a hybrid access mode where the femto node can provide varying levels of access to a given UE (e.g., improved access to UEs in a CSG as opposed to those not in the CSG). In another example, parameter measuring component 210 can determine to consider only measurements over a certain quality as measured (e.g., Ecp), or over a certain transmit power (e.g. as advertised in overhead messages). In any case, a selected portion of signal quality or power measurements can be considered in determining whether to transmit in the wireless network.

In this regard, for example, the network configuration of femto nodes can be a function of an order at which femto nodes are added (e.g., femto nodes that are the latest to be added in a location may not be able to provide wireless service based on measuring the one or more parameters, as described). Thus, in one example, a parameter measuring component 210 can periodically measure signal parameters, and transmit determining component 212 can then determine whether to provide service in the wireless network, to allow femto nodes to provide service when possible based on the measured signal parameters. For example, this can occur according to a configured or determined time period.

In one example, femto node 202 and other femto or macro nodes (such as macro/femto nodes 204 and 206) can be configured with a calibration period during which the nodes can initially decrease transmit power (e.g., to zero or otherwise). The nodes can then perform signal quality measurements and set a transmit power according to a determined timing. Whether or not a calibration period is used, the parameter measuring component 210 can determine the timing based in part on a previous timing (e.g., selecting a timing shifted from the previous timing, such as a next timing, or a first timing where the previous timing is a last available timing). In another example, parameter measuring component 210 can determine the timing based in part on an ordering, a random function, a pseudorandom or other function of a femto node parameter (e.g., identifier), etc. For instance, the timing can be accordingly computed as one of n possible timings, where n is a positive integer. In yet another example, parameter measuring component 210 can receive the timing from one or more core wireless network nodes, such as a femto node gateway or other centralized entity, as discussed further herein, a radio network controller (RNC), a femto node responsible for transmit power calibration, and/or other entities that perform the determination and/or the like). Thus, the timing can be determined (e.g., by each femto node or a centralized entity) based on a round robin approach, such that femto nodes with a later timing in one time period can be assigned an earlier timing in a next period, or random/pseudorandom timings can be otherwise assigned over time, to ensure fairness among the femto nodes for communicating in the wireless network.

Thus, in this example, parameter measuring component 210 can receive the timing, determine the timing based on a function of a parameter of femto node 202, receive a command to perform the measuring and transmit power determining (e.g., based on another entity determining and effectuating the timing), and/or the like. In any case, parameter measuring component 210 measures the signal quality according to the timing or command, and transmit determining component 212 can determine whether to transmit. In one example, whether performed by parameter measuring component 210 or another entity, determining the timing can be based performing a round robin function of previous measurement timings for a given femto node within a calibration period. Thus, for example, where it is determined that a previous measurement for femto node 202 was performed at a timing later than a threshold from the start of the calibration period, parameter measuring component 210 or a similar component of another entity can select an earlier timing for a next calibration period (and notify femto node 202 where the other entity is utilized).

In another example, the round robin approach can be effectuated by parameter measuring component 210 and/or the centralized entity assigning sequential timing offsets to each femto node for each calibration period. The femto nodes can accordingly measure and determine transmit power at the offsets of each period. When a femto node reaches the last (latest) timing offset, it is assigned the first (earliest) timing offset in the next calibration period. As described, parameter measuring component 210 can select an initial timing offset, which can be based on a function of a parameter of femto node 202 (e.g., a femto node or cell identifier) or otherwise, and/or a centralized entity can assign the initial and/or subsequent timing offsets to femto node 202, which parameter measuring component 210 utilizes in measuring signal quality for determining whether to transmit.

Figure 3:
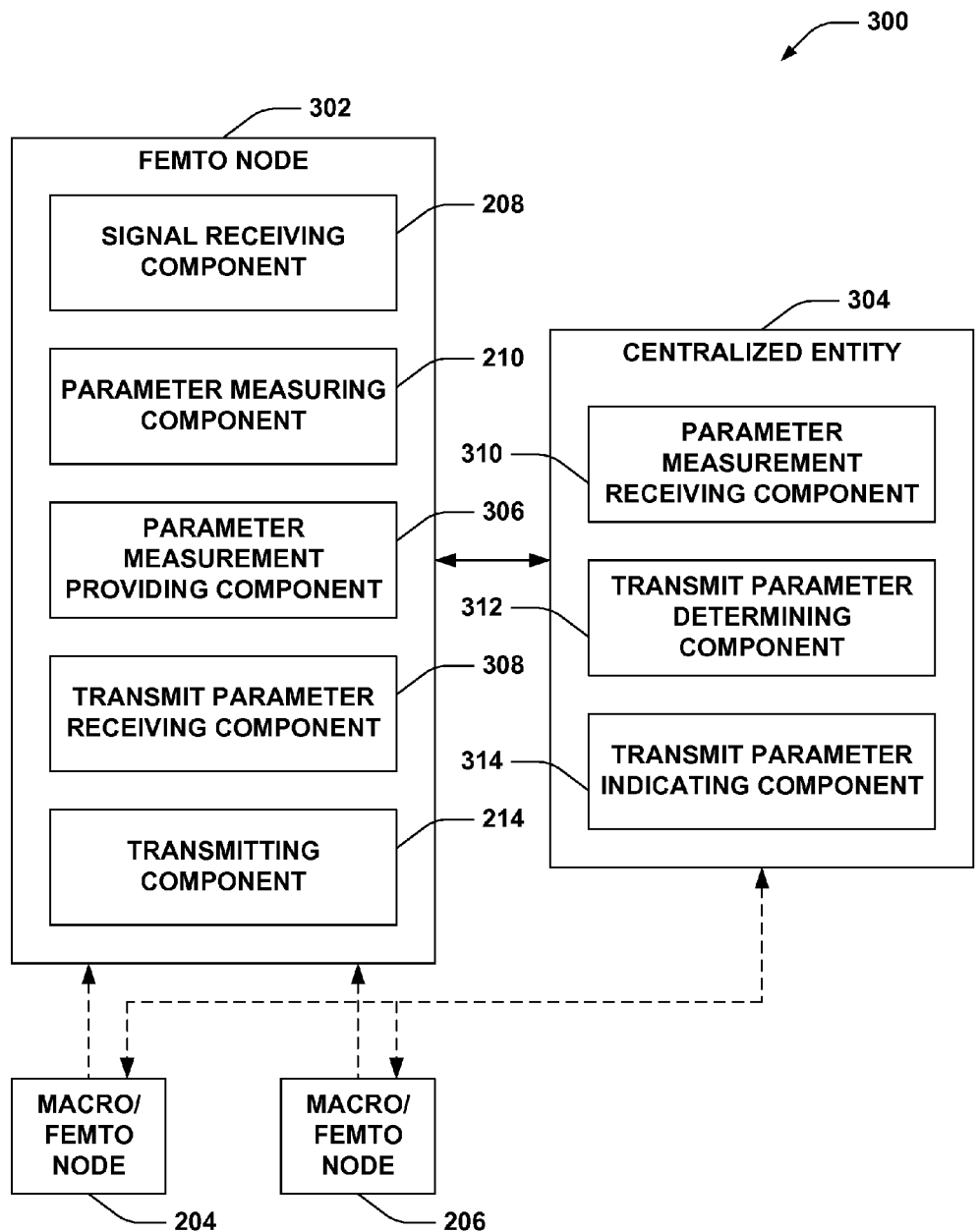
FIG. 3 is a block diagram of an example system for indicating parameters regarding communicating to a femto node based on received signal quality.

Referring to FIG. 3, an example wireless communication system 300 is illustrated that facilitates determining transmit parameters for a femto node. System 300 includes a femto node 302, as well as macro/femto nodes 204 and 206. Femto node 302, as described, can be substantially any low power base station, device, and/or the like. In addition, macro/femto nodes 204 and 206 can each be a low power base station, such as a femto node, pico node, micro node, etc., a macro node, a device (e.g., communicating in peer-to-peer pr ad-hoc mode with other devices), a relay node, and/or the like. System 300 also includes a centralized entity 304 with which femto node 302 and/or macro/femto nodes 204 and 206 can communicate over backhaul connection to a core network, which can be a wired or wireless connection. In another example, centralized entity 304 can be another femto node with which femto node 302 and macro/femto nodes 204 and 206 can communicate.

Femto node 302 includes a signal receiving component 208 for obtaining one or more signals in a wireless network, and a parameter measuring component 210 for determining one or more parameters related to the one or more signals. Femto node 302 also includes a parameter measurement providing component 306 for indicating the one or more parameters to a centralized entity, a transmit parameter receiving component 308 that obtains one or more parameters related to transmitting in the wireless network from the centralized entity, and a transmitting component 214 for communicating in the wireless network based on the one or more parameters related to transmitting.

Centralized entity 304 can include a parameter measurement receiving component 310 for obtaining one or more parameters related to measurements of one or more signals from a femto node, a transmit parameter determining component 312 for generating one or more transmit parameters for the femto node, and a transmit parameter indicating component 314 for communicating the one or more transmit parameters to the femto node.

According to an example, as described, macro/femto nodes 204 and 206 can be deployed in the wireless network, and can transmit signals to advertise wireless service to one or more devices (not shown) and/or to otherwise communicate therewith. Femto nodes 204 and 206 can operate in a channel dedicated for such wireless service (e.g., in a similar frequency space) such that additional communications over the channel may cause interference thereto. In this example, femto node 302 can be deployed within a vicinity of macro/femto nodes 204 and 206, and can thus detect signals therefrom. For example, signal receiving component 208 can receive signals from macro/femto nodes 204 and/or 206, devices communicating therewith, etc., and parameter measuring component 210 can determine one or more parameters related to the signals, such as a measured signal quality. Parameter measurement providing component 306 can communicate the one or more parameters to the centralized entity in one or more reporting periods. Parameter measurement receiving component 310 can obtain the parameters, and transmit parameter determining component 312 can determine whether femto node 302 is to transmit and/or a related transmit power based on the one or more parameters (e.g., similarly to transmit determining component 212, as described above). Transmit parameter indicating component 314 can communicate the indication of whether femto node 302 is to transmit back to femto node 302. Transmit parameter receiving component 308 can obtain the indication, and transmitting component 214 can accordingly transmit signals to provide wireless service or refrain from transmitting such signals based on the indication.

By allowing the centralized entity 304 to determine whether the femto 302 can transmit, for example, additional parameters can be considered by transmit parameter determining component 312 in determining whether femto node 302 should transmit in the wireless network. In one example, parameter measurement receiving component 310 can obtain measurements from various femto nodes, such as macro/femto nodes 204 and 206, and thus, transmit parameter determining component 312 can consider measurements from the other femto nodes in determining whether the femto node 302 should transmit in the wireless network. Moreover, for example, transmit parameter determining component 312 can obtain other parameters, such as loading information of one or more femto nodes, a location of one or more femto nodes, access mode of one or more femto nodes (e.g., open, closed, hybrid, etc.), nodes neighboring one or more femto nodes, related signal strengths of each of the nodes as received at the one or more femto nodes, transmit powers of each of the nodes, and/or the like, and transmit parameter determining component 312 can utilize such parameters to determine whether femto node 302 should transmit in the wireless network.

For example, transmit parameter determining component 312 can determine loading information for femto nodes neighboring femto node 302. Where the neighboring femto nodes have a load over a threshold (e.g., an average load among the femto nodes, a maximum load, etc.), transmit parameter determining component 312 may determine to allow femto node 302 to transmit in the wireless network to relieve some of the load even where the signal quality reported by femto node 302 is over a threshold. Thus, in one example, transmit parameter determining component 312 may set the threshold signal quality based on the additional parameters (e.g., set a higher threshold for the signal quality where load of neighboring femto nodes is over a threshold load).

In another example, transmit parameter determining component 312 can determine whether femto node 302 should transmit based in part on signal qualities reported by other femto nodes, such as macro/femto nodes 204 and 206 or historical transmit indications provided to the femto node 302 and/or macro/femto nodes 204 and 206 to ensure fairness to femto node 302 and macro/femto nodes 204 and 206 when determining whether the nodes should transmit. For instance, where transmit parameter determining component 312 determines that femto node 302 and macro/femto nodes 204 and 206 report signal quality over a threshold for a previous number of reporting periods, a round robin approach can be used to provide fairness in allowing the femto nodes 302 and macro/femto nodes 204 and 206 to transmit in the wireless network. In one example, transmit parameter determining component 312 can determine whether femto node 302 and/ or macro/femto nodes 204 and 206 can transmit in the wireless network by ordering the femto nodes (e.g., based on an order that the femto nodes initiated connection with the network), and indicating to a certain number of femto nodes, determined by transmit parameter determining component 312 based on reported signal qualities, to transmit via transmit parameter indicating component 314. Transmit parameter determining component 312 can shift the ordering by one, or starting with the first femto node that was indicated to not transmit, in a subsequent reporting period to ensure fairness across femto nodes.

In another example, transmit parameter determining component 312 can additionally determine a number of transmission opportunities the femto node 302 has had over a period of time (and/or can compare this to transmission opportunities of other femto nodes, such as femto nodes 204 and 206). This can include measuring whether transmit parameter indicating component 314 has indicated to femto node 302 to transmit over the period of time. Where transmit parameter determining component 312 has indicated that femto node 302 not transmit over all or a threshold portion of the reporting periods, transmit parameter determining component 312 determines that femto node 302 should transmit in a current opportunity, and transmit parameter indicating component 314 so notifies the femto node 302. In another example, where transmit parameter determining component 312 determines that femto node 302 has been indicated to transmit in all or at least a threshold portion of the reporting periods, and other femto nodes have not had the opportunity to transmit, transmit parameter determining component 312 can determine to not allow femto node 302 to transmit in a current opportunity, and transmit parameter indicating component 314 can so notify femto node 302. In any case, transmit parameter receiving component 308 obtains the indication, and transmitting component 214 accordingly transmits or refrains from transmitting, as described.

In yet another example, periodic calibration periods for determining whether a femto node should transmit can be utilized to ensure that each femto node communicating with the centralized entity 304 has an opportunity to transmit over a given period of time. In this example, centralized entity 304 can command femto node 302, and other femto nodes, to enter the calibration period and institute timing offsets during the calibration periods within which the femto nodes during which to report measurements for determining whether the femto node 302 should transmit in the wireless network. For example, transmit parameter determining component 312 can assign timing offsets to femto node 302 and other femto nodes, such as macro/femto nodes 204 and 206, over a plurality of calibration periods. In this example, transmitting component 214 can initially cease transmission during the calibration period, and transmit parameter receiving component 308 can obtain a timing offset transmitted by transmit parameter indicating component 314.

Parameter measuring component 210 can measure the parameters of signals from macro/femto nodes 204 and 206 and/or devices communicating therewith following the timing offset, and parameter measurement providing component 306 can accordingly provide the measurements to centralized entity 304 for determining whether femto node 302 should transmit in the wireless network. As described, transmit parameter determining component 312 can assign timing offsets to a plurality of femto nodes, including sequential timing offsets (e.g., assigning differing offsets to various femto nodes) to provide a round robin approach, offsets computed based on a function of another parameter of femto node 302, offsets determined based on loading or other parameters at femto node 302 and/or other femto nodes, and/or the like.

FIGS. 4-7 illustrate example methodologies relating to measuring signal quality to determine whether a femto node should communicate in a wireless network. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4:
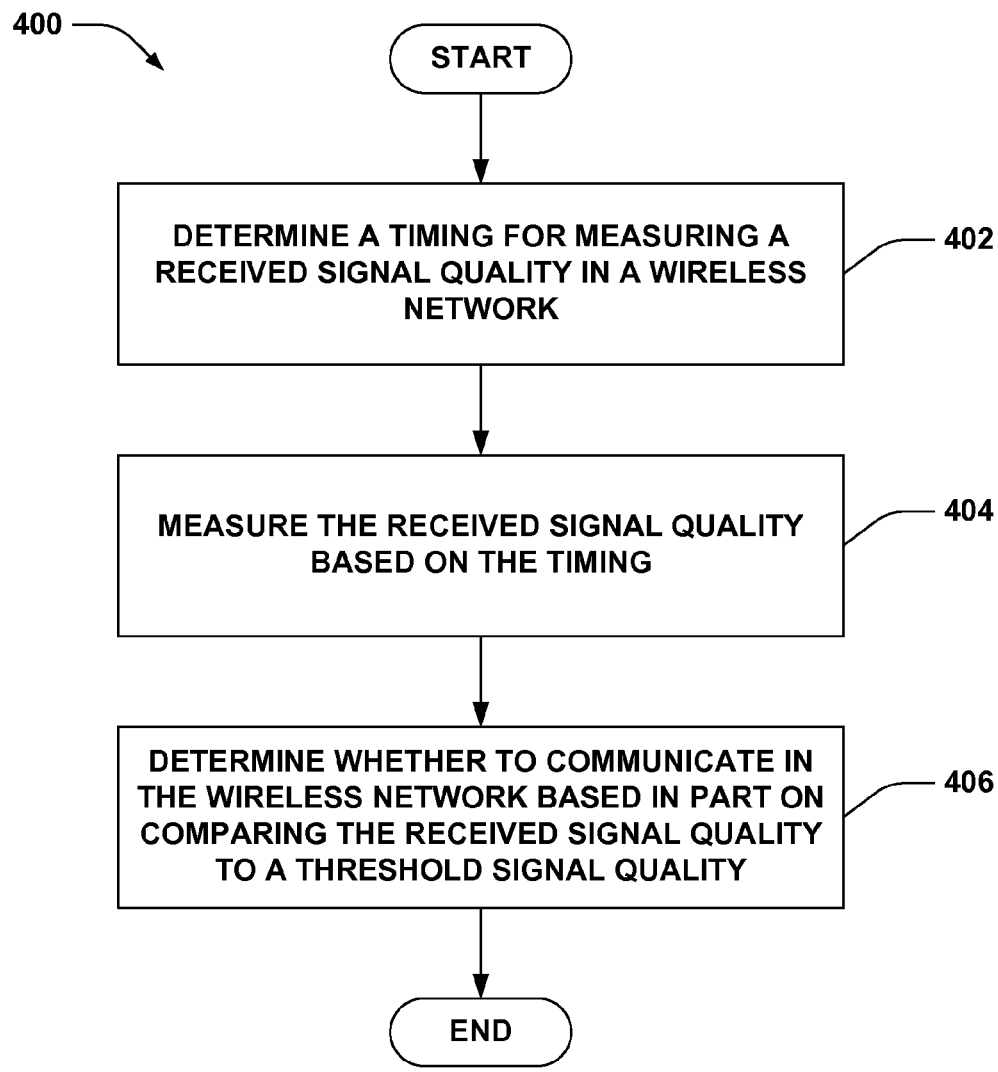
FIG. 4 is a flow chart of an aspect of an example methodology for determining whether to communicate in a wireless network.

FIG. 4 depicts an example methodology 400 for measuring received signal quality to determine whether to communicate in a wireless network.

At 402, a timing for measuring a received signal quality in a wireless network can be determined Determining the timing can include receiving the timing from a centralized entity, determining the timing by shifting a previous timing, determining the timing using a random function or a pseudorandom function based on an identifier or other parameter of a femto node, determining the timing based on one or more parameters of other femto nodes (e.g., a number of previous transmission opportunities provided thereto), and/or the like.

At 404, the received signal quality can be measured based on the timing. For example, the timing can correspond to an offset from a calibration period during which femto nodes silence communications, measure received signal quality during corresponding timing offsets, and determine whether to initialize communication in the wireless network. Measuring signal quality can include measuring RSSI, SNR, Ecp, Ecp/Io, etc.

At 406, it can be determined whether to communicate in the wireless network based in part on comparing the received signal quality to a threshold signal quality. Where the received signal quality is over the threshold, for example, it can be determined not to communicate in the wireless network to mitigate interference caused to other nodes. By using the timing for measuring the signal quality, a fairness can be provided among femto nodes where the timing can be modified over time to ensure all femto nodes have an opportunity to communicate based on experiencing a low received signal quality.

Figure 5:
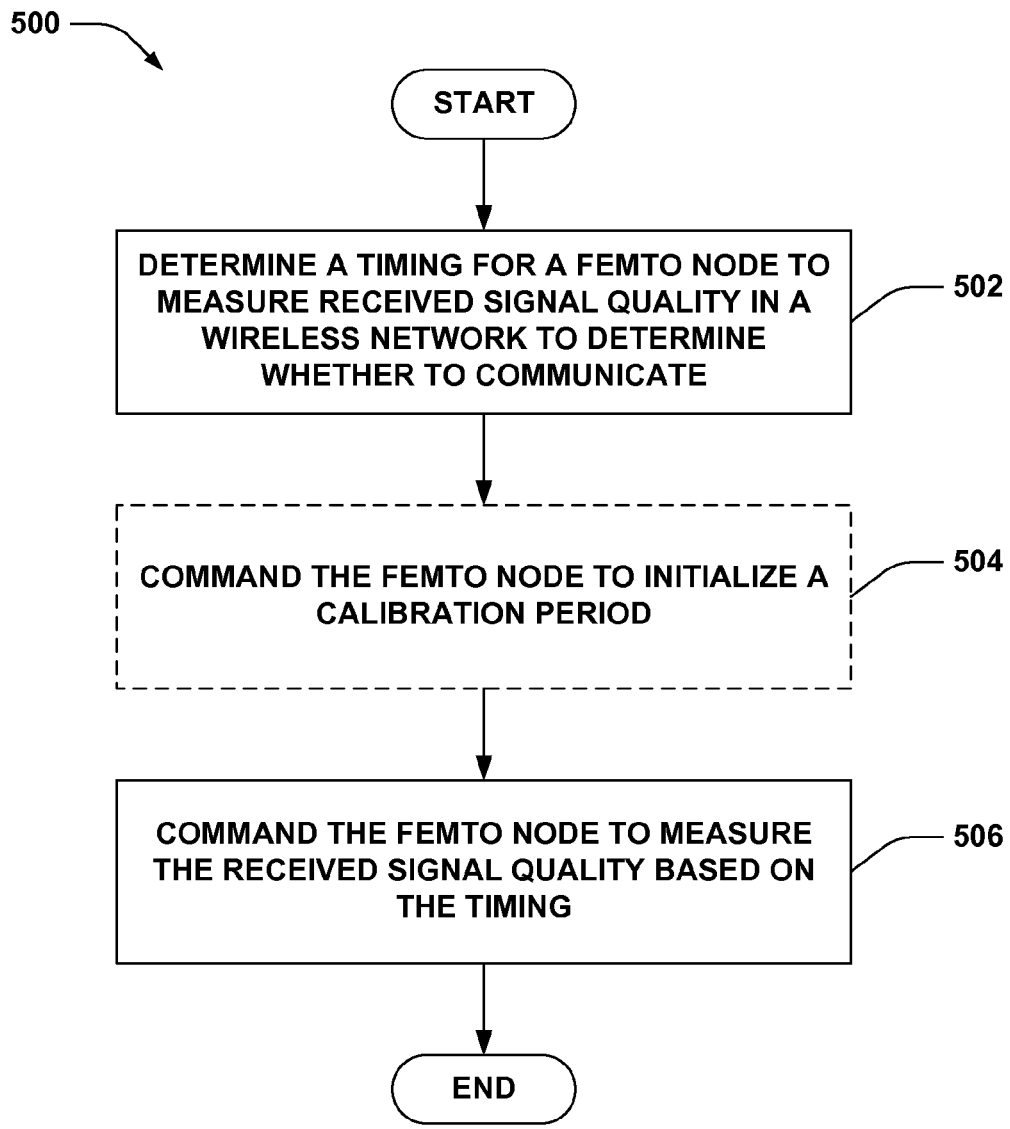
FIG. 5 is a flow chart of an aspect of an example methodology for commanding a femto node to measure received signal quality in a wireless network.

FIG. 5 illustrates an example methodology 500 for commanding a femto node to measure received signal quality according to a timing.

At 502, a timing can be determined for a femto node to measure received signal quality in a wireless network to determine whether to communicate. For example, the timing can be determined based on a previous timing, an ordering, a random function, a pseudorandom function based on an identifier or other parameter of the femto node, a number of transmission opportunities provided to the femto nodes over a period of time, the number of times a femto node has reported signal quality over a threshold, and/or the like.

Optionally, at 504, the femto node can be commanded to initialize a calibration period. For example, this can include indicating a command or time for the femto node to enter the calibration period. As described, the calibration can relate to the femto node refraining from transmitting in the wireless network until instructed to or until an indicated timing offset has expired.

At 506, the femto node can be commanded to measure the received signal quality based on the timing. As described, this can include indicating a timing offset to the femto node, or otherwise indicating to the femto node to measure the received signal quality.

Figure 6:
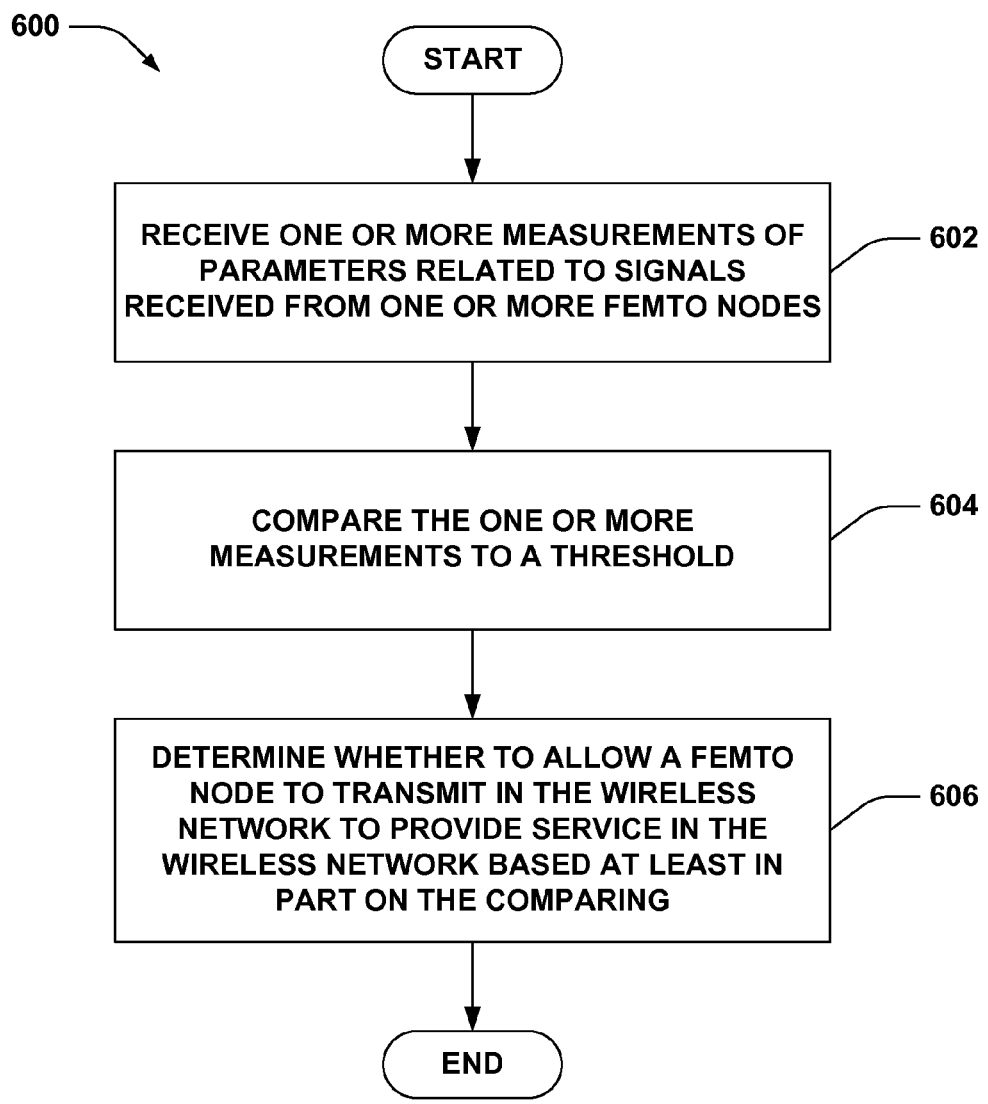
FIG. 6 is a flow chart of an aspect of an example methodology for determining whether to allow a femto node to provide wireless service.

FIG. 6 shows an example methodology 600 that facilitates determining whether to allow a femto node to provide service in a wireless network.

At 602, one or more measurements of parameters related to signals received from one or more femto nodes can be received. For example, the one or more measurements can be received based on analyzing the one or more signals from neighboring femto nodes. In another example, the one or more measurements can be received from a femto node, etc. The one or more parameters can correspond to a total RSSI, Ecp, SNR, Ecp/Io, and/or the like corresponding to the signals, as described.

At 604, the one or more measurements can be compared to a threshold. The threshold can be a configured parameter, whether hardcoded or received from a core network component, a computed parameter based on historical comparisons, and/or the like.

At 606, it can be determined whether to allow a femto node to transmit in the wireless network to provide service in the wireless network based at least in part on the measuring. For example, this can include comparing the one or more parameters to one or more threshold values at 404 to determine whether to allow the femto node to provide wireless service, as described. In one example, based on the determination, the femto node can transmit or refrain from transmitting signals in the wireless network for providing service.

Figure 7:
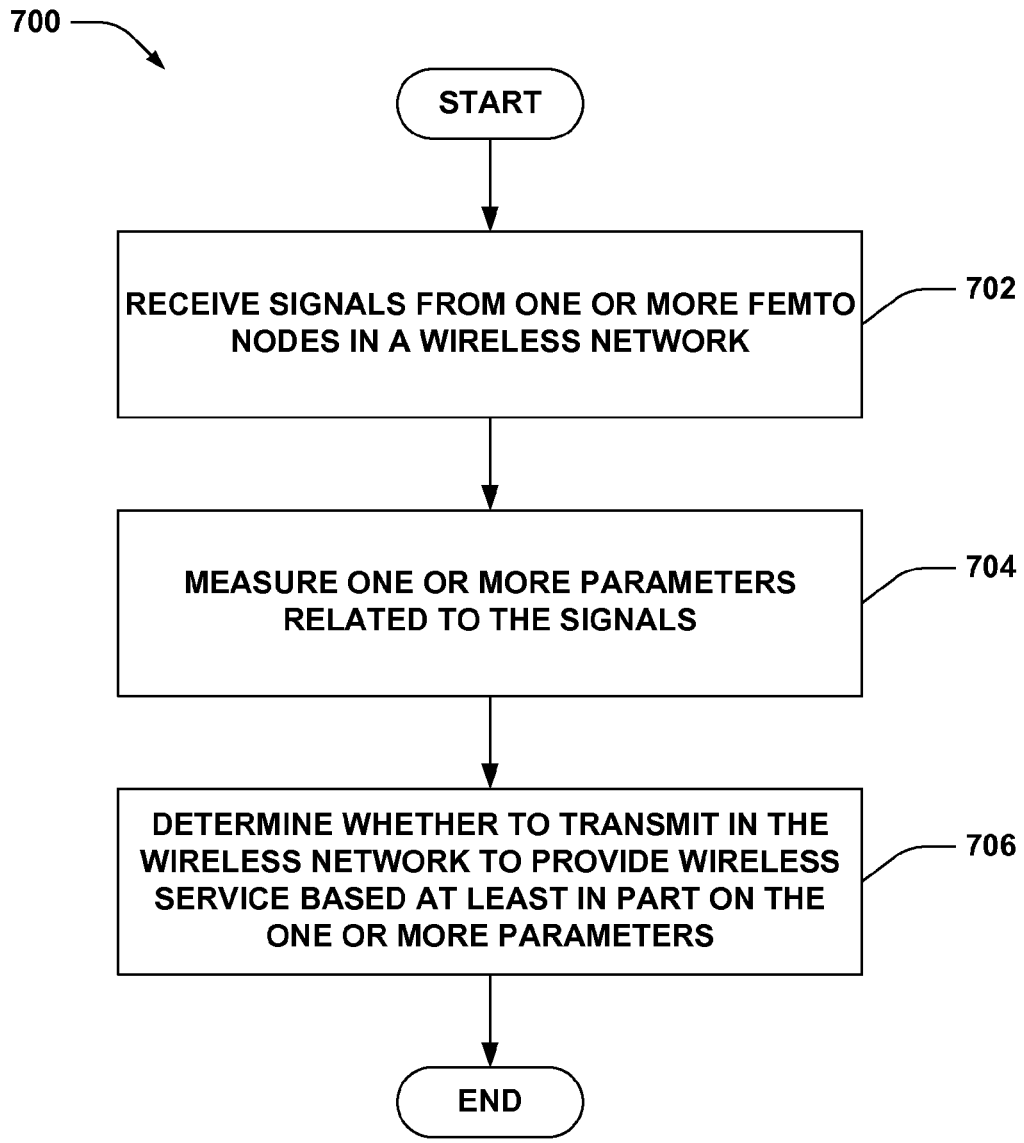
FIG. 7 is a flow chart of an aspect of an example methodology for determining whether to provide service in a wireless network.

Referring to FIG. 7, an example methodology 700 for determining whether to provide service in a wireless network is shown.

At 702, signals from one or more femto nodes can be received in a wireless network. This can include receiving the signals over a transceiver.

At 704, one or more parameters related to the signals can be measured. For example, the one or more parameters can include a total RSSI, Ecp, SNR, Ecp/Io, etc., as described.

At 706, it can be determined whether to transmit in the wireless network to provide wireless service based at least in part on the one or more parameters. Thus, for example, the one or more parameters can be measured against a threshold that indicates to transmit or refrain from transmitting signals for providing service in the wireless network, as described.

It will be appreciated that, in accordance with one or more aspects described herein, inferences can be made regarding determining timings for allowing femto nodes to measure received signal qualities, determining whether to allow a femto node to transmit in a wireless network, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
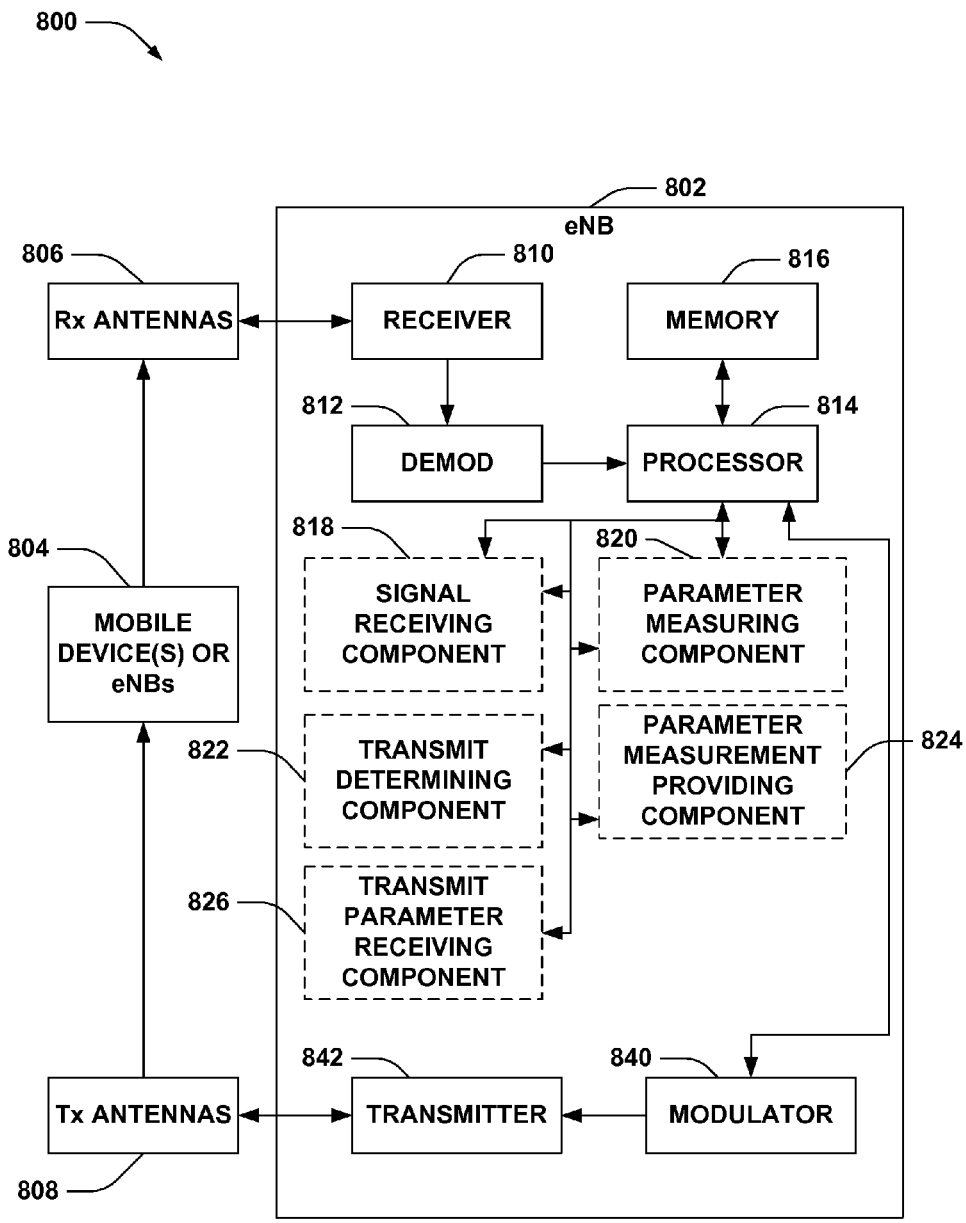
FIG. 8 is a block diagram of a system in accordance with aspects described herein.

FIG. 8 is an illustration of a system 800 that facilitates measuring signal quality for determining whether to transmit in a wireless network. System 800 includes a eNB 802 having a receiver 810 that receives signal(s) from one or more mobile devices or eNBs 804 through a plurality of receive antennas 806 (e.g., which can be of multiple network technologies), and a transmitter 842 that transmits to the one or more mobile devices or eNBs 804 through a plurality of transmit antennas 808 (e.g., which can be of multiple network technologies). For example, eNB 802 can transmit signals received from eNBs 804 to other eNBs 804, and/or vice versa. Receiver 810 can receive information from one or more receive antennas 806 and is operatively associated with a demodulator 812 that demodulates received information. In addition, in an example, receiver 810 can receive from a wired backhaul link. Though depicted as separate antennas, it is to be appreciated that at least one of receive antennas 806 and a corresponding one of transmit antennas 808 can be combined as the same antenna. Demodulated symbols are analyzed by a processor 814, which is coupled to a memory 816 that stores information related to performing one or more aspects described herein.

Processor 814, for example, can be a processor dedicated to analyzing information received by receiver 810 and/or generating information for transmission by a transmitter 842, a processor that controls one or more components of eNB 802, and/or a processor that analyzes information received by receiver 810, generates information for transmission by transmitter 842, and controls one or more components of eNB 802. In addition, processor 814 can perform one or more functions described herein and/or can communicate with components for such a purpose.

Memory 816, as described, is operatively coupled to processor 814 and can store data to be transmitted, received data, information related to available channels, data associated with analyzed signal and/or interference strength, information related to an assigned channel, power, rate, or the like, and any other suitable information for estimating a channel and communicating via the channel. Memory 816 can additionally store protocols and/or algorithms associated with measuring signal quality, determining whether to transmit in a wireless network, and/or the like.

It will be appreciated that the data store (e.g., memory 816) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 816 of the subject systems and methods is intended to comprise, without being limited to, these and any other suitable types of memory.

Processor 814 is further optionally coupled to a signal receiving component 818, which can be similar to signal receiving component 208, a parameter measuring component 820, which can be similar to parameter measuring component 210, transmit determining component 822, which can be similar to transmit determining component 212, a parameter measurement providing component 824, which can be similar to parameter measurement providing component 306, and/or transmit parameter receiving component 826, which can be similar to transmit parameter receiving component 308. Moreover, for example, processor 814 can modulate signals to be transmitted using modulator 840, and transmit modulated signals using transmitter 842. Transmitter 842 can transmit signals to mobile devices or eNBs 804 over Tx antennas 808, and can be similar to transmitting component 214. Furthermore, although depicted as being separate from the processor 814, it is to be appreciated that the signal receiving component 818, parameter measuring component 820, transmit determining component 822, parameter measurement providing component 824, transmit parameter receiving component 826, demodulator 812, and/or modulator 840 can be part of the processor 814 or multiple processors (not shown), and/or stored as instructions in memory 816 for execution by processor 814.

Figure 9:
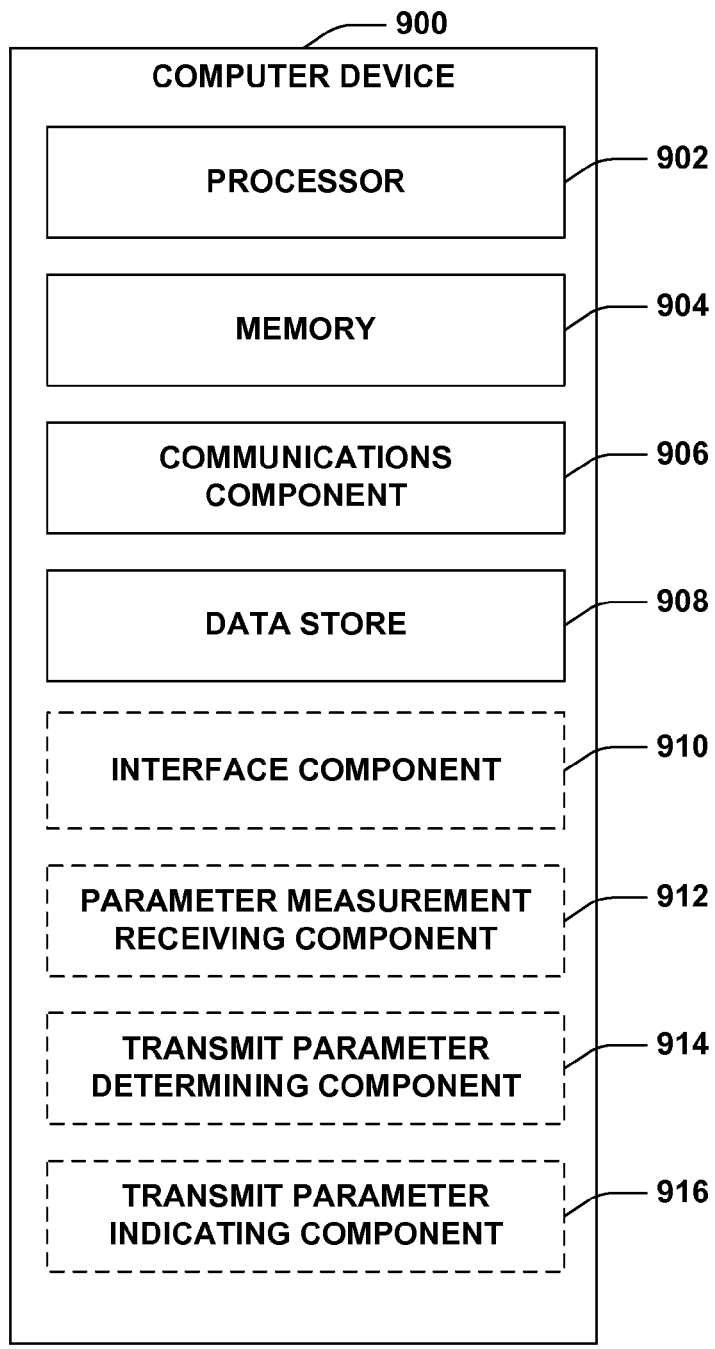
FIG. 9 is a block diagram of an example computer device in accordance with aspects described herein.

FIG. 9 illustrates a computer device 900 that can include a centralized entity 304. Computer device 900 includes a processor 902 for carrying out processing functions associated with one or more of components and functions described herein. Processor 902 can include a single or multiple set of processors or multi-core processors. Moreover, processor 902 can be implemented as an integrated processing system and/or a distributed processing system.

Computer device 900 further includes a memory 904, such as for storing local versions of applications being executed by processor 902. Memory 904 can include substantially any type of memory usable by a computer, such as random access memory (RAM), read only memory (ROM), tapes, magnetic discs, optical discs, volatile memory, non-volatile memory, and any combination thereof. Computer device 900 also includes one or more components 906-916, which can be stored in memory 904, executed by processor 902 (e.g., based on instructions stored in memory 904), be implemented within one or more processors 902, and/or the like.

Further, computer device 900 includes a communications component 906 that provides for establishing and maintaining communications with one or more parties utilizing hardware, software, and services as described herein. Communications component 906 may carry communications between components on computer device 900, as well as between computer device 900 and external devices, such as devices located across a communications network and/or devices serially or locally connected to computer device 900. For example, communications component 906 may include one or more buses, and may further include transmit chain components and receive chain components associated with a transmitter and receiver, respectively, operable for interfacing with external devices.

Additionally, computer device 900 may further include a data store 908, which can be any suitable combination of hardware and/or software, that provides for mass storage of information, databases, and programs employed in connection with aspects described herein. For example, data store 908 may be a data repository for applications not currently being executed by processor 902.

Computer device 900 may optionally include an interface component 910 operable to receive inputs from a user of computer device 900, and further operable to generate outputs for presentation to the user. Interface component 910 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 910 may include one or more output devices, including but not limited to a display, a speaker, a haptic feedback mechanism, a printer, any other mechanism capable of presenting an output to a user, or any combination thereof. In another example, interface component 910 can be an application programming interface (API) that can be accessed by one or more devices to perform functions on computer device 900.

In addition, in the depicted example, computer device 900 can optionally include one or more of a parameter measurement receiving component 912, which can be similar to parameter measurement receiving component 310, a transmit parameter determining component 914, which can be similar to transmit parameter determining component 312, and/or a transmit parameter indicating component 916, which can be similar to transmit parameter indicating component 314. Thus, these components 912, 914, and/or 916 can utilize processor 902 to execute instructions associated therewith, memory 904 to store information associated therewith, communications component 906 to carry out communications, and/or the like, as described. In addition, it is to be appreciated that computer device 900 can include additional or alternative components described herein.

Figure 10:
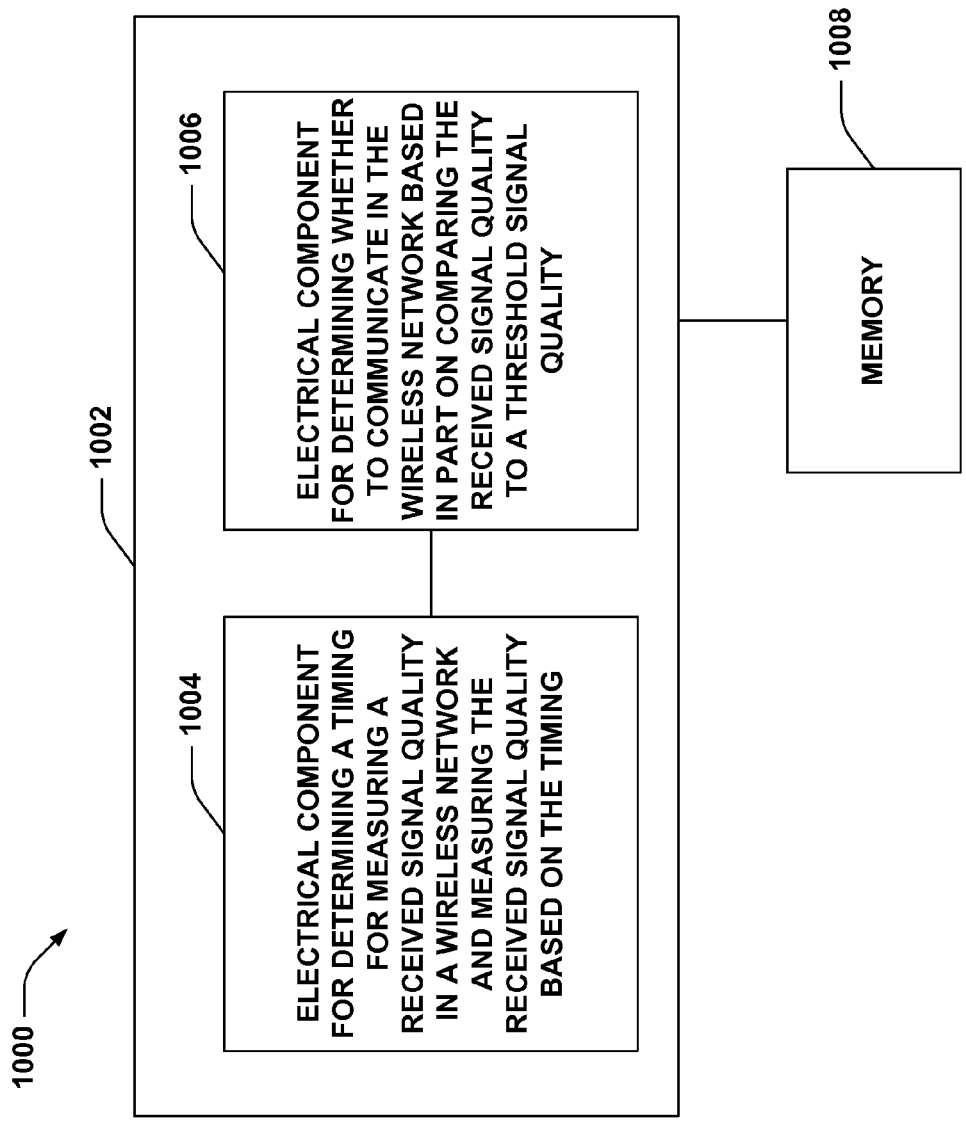
FIG. 10 is a block diagram of an aspect of a system that determines whether to communicate in a wireless network.

FIG. 10 illustrates a system 1000 for determining whether to communicate in a wireless network based on measuring received signal quality. For example, system 1000 can reside at least partially within a femto node or other low power base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for determining a timing for measuring a received signal quality in a wireless network and measuring the received signal quality based on the timing 1004. As described, determining the timing can be based on receiving the timing, determining the timing based on one or more functions or parameters of other femto nodes, and/or the like. Further, logical grouping 1002 can include an electrical component for determining whether to communicate in the wireless network based in part on comparing the received signal quality to a threshold signal quality 1006. The timing can vary such that electrical component 1006 can determine to transmit at least a certain number of times over a given period.

For example, electrical component 1004 can include a parameter measuring component 210, as described above. Electrical component 1006 can include a transmit determining component 212, as described.

Additionally, system 1000 can include a memory 1008 that retains instructions for executing functions associated with the electrical components 1004 and 1006. While shown as being external to memory 1008, it is to be understood that one or more of the electrical components 1004 and 1006 can exist within memory 1008. In one example, electrical components 1004 and 1006 can include at least one processor, or each electrical component 1004 and 1006 can be a corresponding module of at least one processor. Moreover, in an additional or alternative example, electrical components 1004 and 1006 can be a computer program product comprising a computer readable medium, where each electrical component 1004 and 1006 can be corresponding code.

Figure 11:
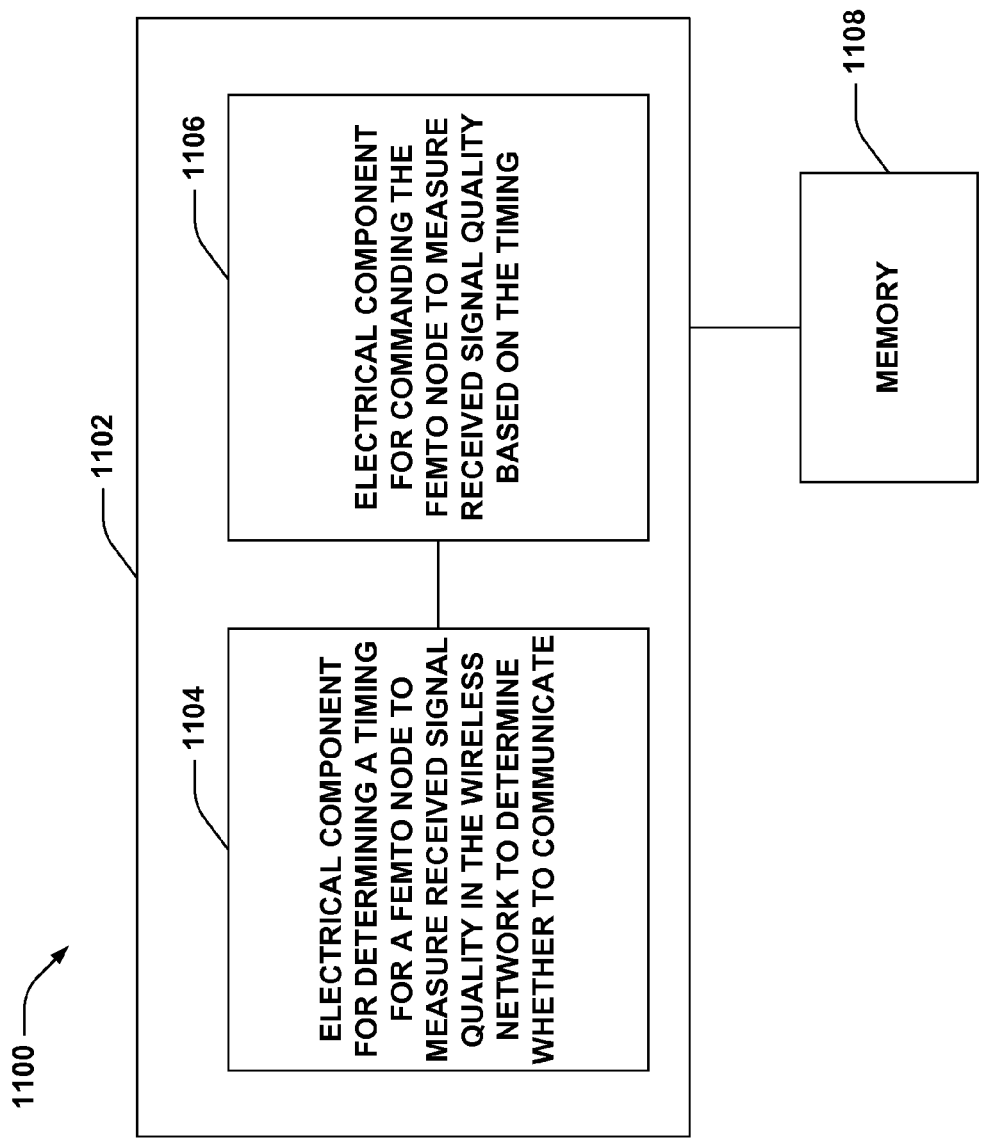
FIG. 11 is a block diagram of an aspect of a system that commands a femto node to measure received signal quality in a wireless network.

FIG. 11 illustrates a system 1100 for commanding a femto node to measure receiving signal quality for determining whether to communicate in a wireless network. For example, system 1100 can reside at least partially within a centralized entity, such as a femto node gateway, a femto node, and/or the like. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for determining a timing for a femto node to measure received signal quality in the wireless network to determine whether to communicate 1104. As described, determining the timing can be based on determining the timing based on one or more functions or parameters of other femto nodes, and/or the like. Further, logical grouping 1102 can include an electrical component for commanding the femto node to measure received signal quality based on the timing 1106. The timing can be chosen to allow femto nodes a fair opportunity to measure the received signal quality such to determine to transmit in the wireless network, as described.

For example, electrical component 1104 can include a transmit parameter determining component 312, as described above. In addition, for example, electrical component 1106, in an aspect, can include a transmit parameter indicating component 314, as described.

Additionally, system 1100 can include a memory 1108 that retains instructions for executing functions associated with the electrical components 1104 and 1106. While shown as being external to memory 1108, it is to be understood that one or more of the electrical components 1104 and 1106 can exist within memory 1108. In one example, electrical components 1104 and 1106 can include at least one processor, or each electrical component 1104 and 1106 can be a corresponding module of at least one processor. Moreover, in an additional or alternative example, electrical components 1104 and 1106 can be a computer program product comprising a computer readable medium, where each electrical component 1104 and 1126 can be corresponding code.

Figure 12:
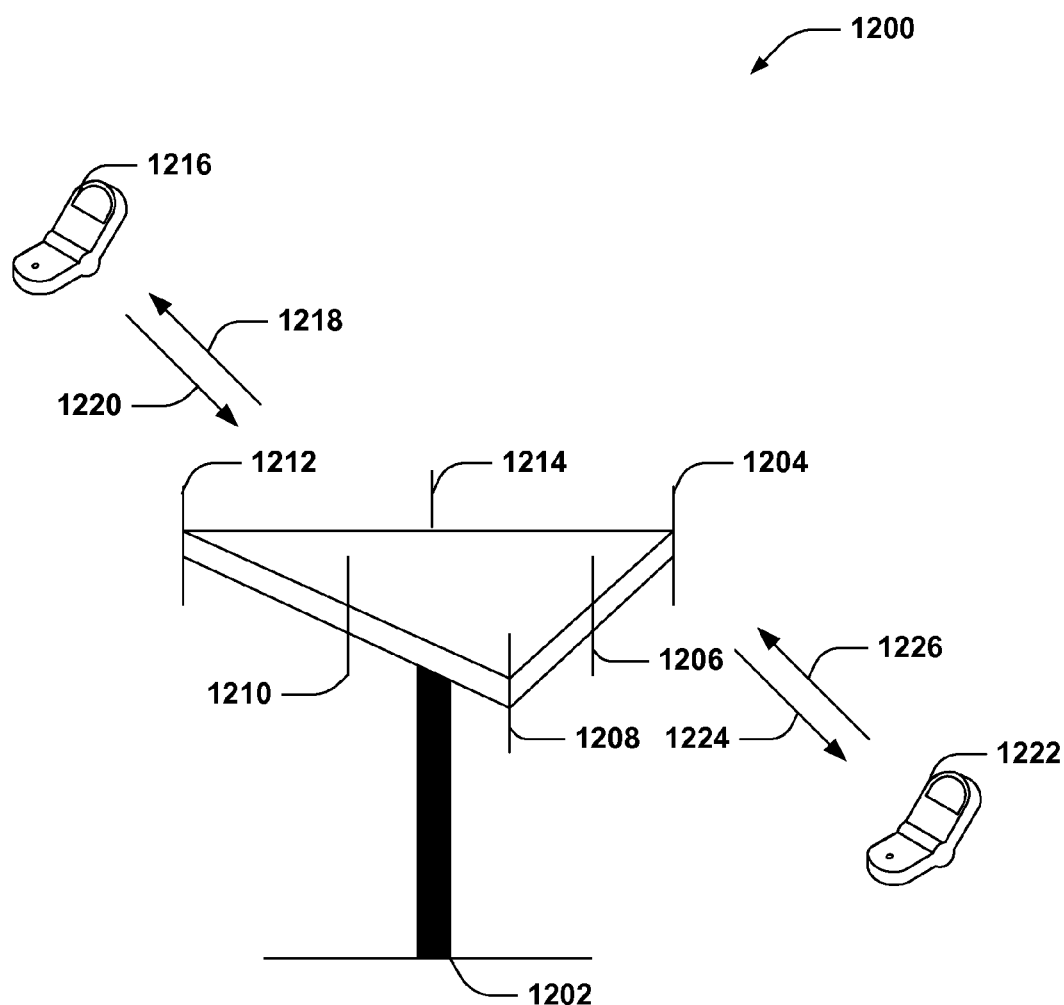
FIG. 12 is a block diagram of an aspect of a wireless communication system in accordance with various aspects set forth herein.

FIG. 12 illustrates a wireless communication system 1200 in accordance with various embodiments presented herein. System 1200 comprises a base station 1202 that can include multiple antenna groups. For example, one antenna group can include antennas 1204 and 1206, another group can comprise antennas 1208 and 1210, and an additional group can include antennas 1212 and 1214. Two antennas are illustrated for each antenna group; however, more or fewer antennas can be utilized for each group. Base station 1202 can additionally include a transmitter chain and a receiver chain, each of which can in turn comprise a plurality of components or modules associated with signal transmission and reception (e.g., processors, modulators, multiplexers, demodulators, demultiplexers, antennas, etc.), as is appreciated.

Base station 1202 can communicate with one or more mobile devices such as mobile device 1216 and mobile device 1222; however, it is to be appreciated that base station 1202 can communicate with substantially any number of mobile devices similar to mobile devices 1216 and 1222. Mobile devices 1216 and 1222 can be, for example, cellular phones, smart phones, laptops, handheld communication devices, handheld computing devices, satellite radios, global positioning systems, PDAs, and/or any other suitable device for communicating over wireless communication system 1200. As depicted, mobile device 1216 is in communication with antennas 1212 and 1214, where antennas 1212 and 1214 transmit information to mobile device 1216 over a forward link 1218 and receive information from mobile device 1216 over a reverse link 1220. Moreover, mobile device 1222 is in communication with antennas 1204 and 1206, where antennas 1204 and 1206 transmit information to mobile device 1222 over a forward link 1224 and receive information from mobile device 1222 over a reverse link 1226. In a frequency division duplex (FDD) system, forward link 1218 can utilize a different frequency band than that used by reverse link 1220, and forward link 1224 can employ a different frequency band than that employed by reverse link 1226, for example. Further, in a time division duplex (TDD) system, forward link 1218 and reverse link 1220 can utilize a common frequency band and forward link 1224 and reverse link 1226 can utilize a common frequency band.

Each group of antennas and/or the area in which they are designated to communicate can be referred to as a sector of base station 1202. For example, antenna groups can be designed to communicate to mobile devices in a sector of the areas covered by base station 1202. In communication over forward links 1218 and 1224, the transmitting antennas of base station 1202 can utilize beamforming to improve signal-to-noise ratio of forward links 1218 and 1224 for mobile devices 1216 and 1222. Also, while base station 1202 utilizes beamforming to transmit to mobile devices 1216 and 1222 scattered randomly through an associated coverage, mobile devices in neighboring cells can be subject to less interference as compared to a base station transmitting through a single antenna to all its mobile devices. Moreover, mobile devices 1216 and 1222 can communicate directly with one another using a peer-to-peer or ad hoc technology as depicted.

Figure 13:
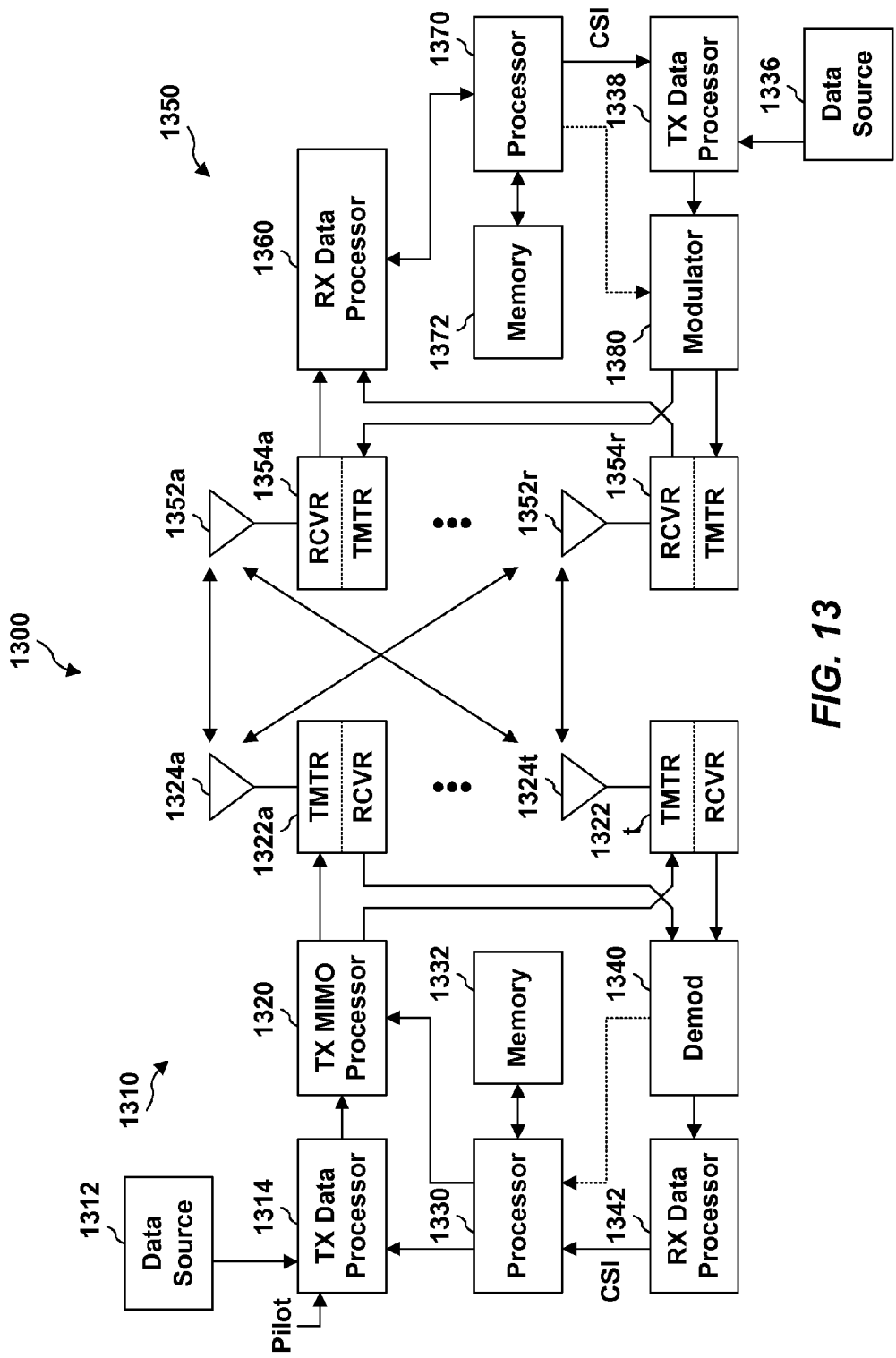
FIG. 13 is a schematic block diagram of an aspect of a wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. Moreover, base station 1310 can be a low power base station, in one example, such as one or more femto nodes previously described. In addition, it is to be appreciated that base station 1310 and/or mobile device 1350 can employ the example systems (FIGS. 1-3 and 8-12) and/or methods (FIGS. 4-7) described herein to facilitate wireless communication there between. For example, components or functions of the systems and/or methods described herein can be part of a memory 1332 and/or 1372 or processors 1330 and/or 1370 described below, and/or can be executed by processors 1330 and/or 1370 to perform the disclosed functions.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At mobile device 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. For example, processor 1330 and/or 1370 can execute, and/or memory 1332 and/or 1372 can store instructions related to functions and/or components described herein, such as measuring received signal quality to determine whether to communicate in a wireless network, determining timing for measuring the received signal quality, and/or the like, as described.

Figure 14:
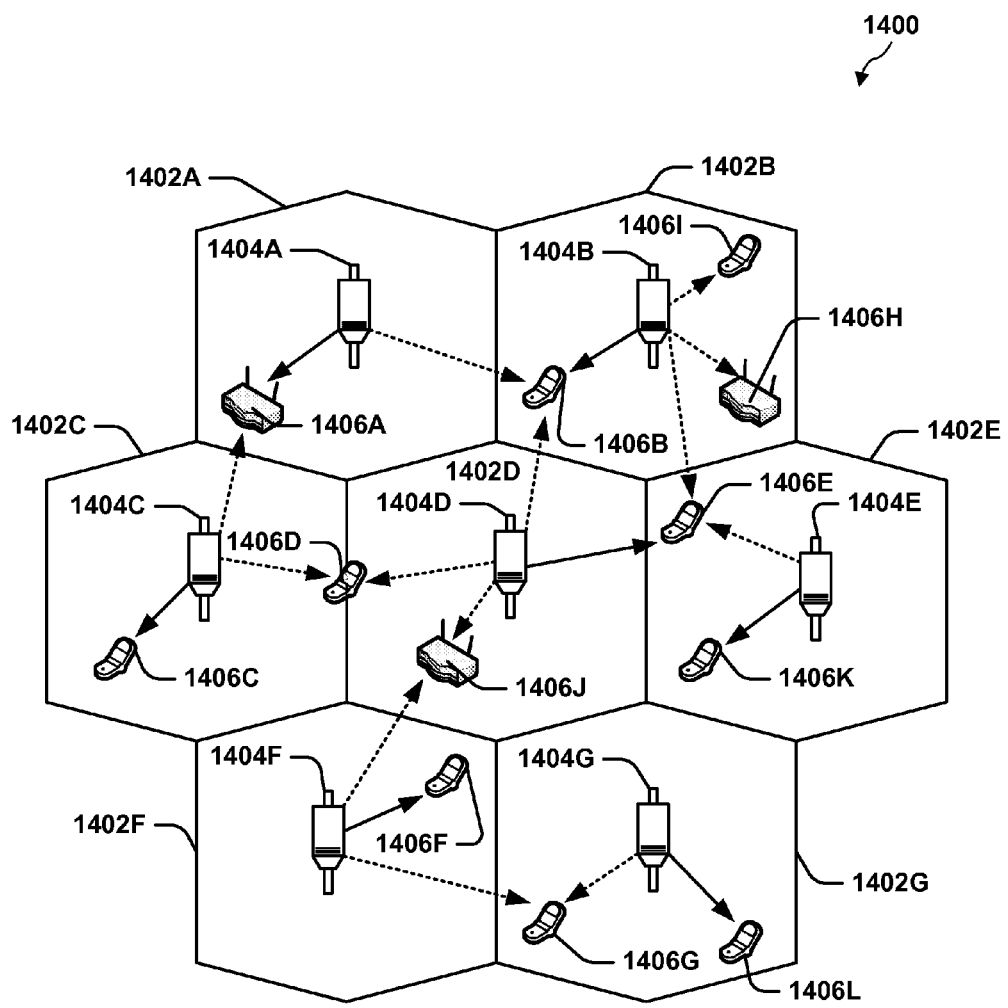
FIG. 14 illustrates an example wireless communication system, configured to support a number of devices, in which the aspects herein can be implemented.

FIG. 14 illustrates a wireless communication system 1400, configured to support a number of users, in which the teachings herein may be implemented. The system 1400 provides communication for multiple cells 1402, such as, for example, macro cells 1402A-1402G, with each cell being serviced by a corresponding access node 1404 (e.g., access nodes 1404A-1404G). As shown in FIG. 14, access terminals 1406 (e.g., access terminals 1406A-1406L) can be dispersed at various locations throughout the system over time. Each access terminal 1406 can communicate with one or more access nodes 1404 on a forward link (FL) and/or a reverse link (RL) at a given moment, depending upon whether the access terminal 1406 is active and whether it is in soft handoff, for example. The wireless communication system 1400 can provide service over a large geographic region.

Figure 15:
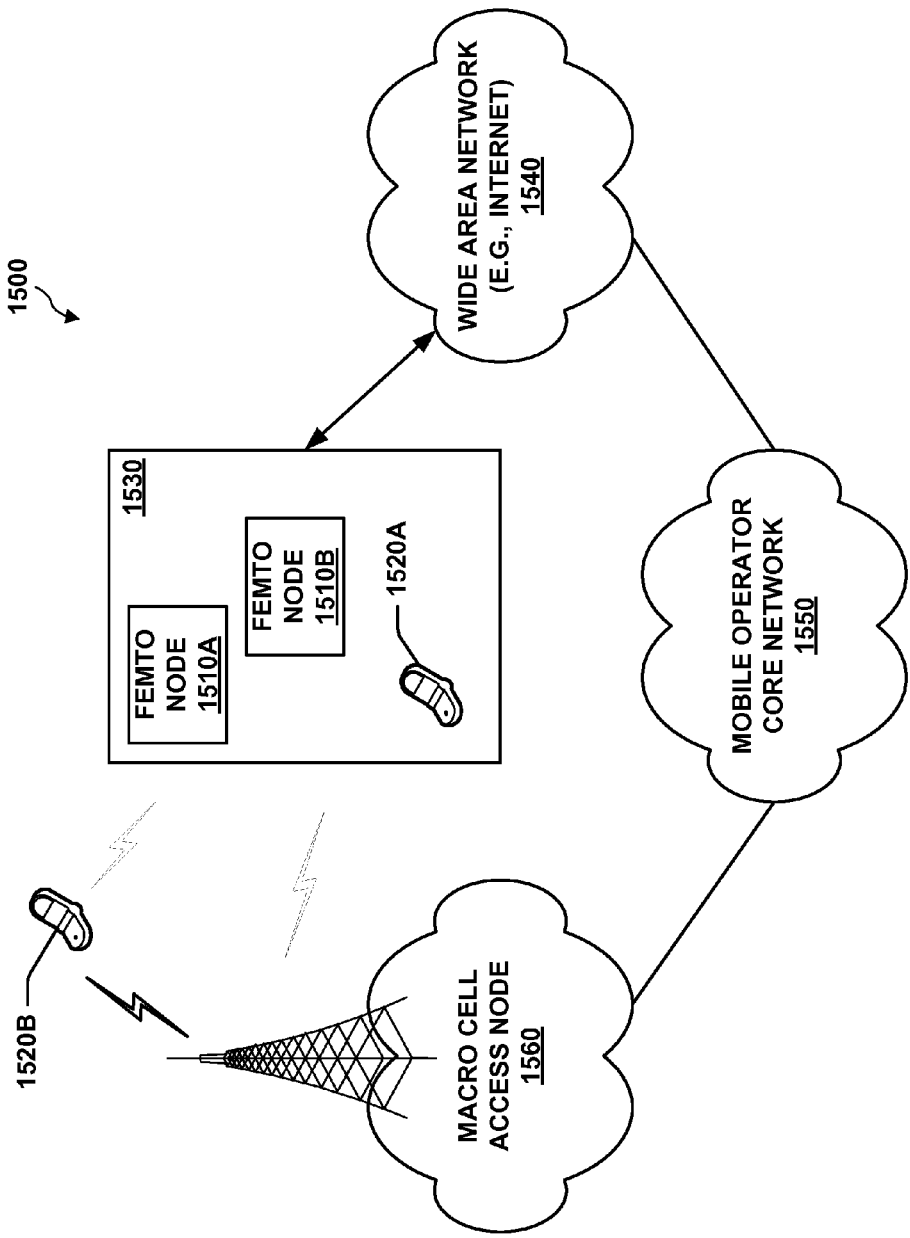
FIG. 15 is an illustration of an exemplary communication system to enable deployment of femtocells within a network environment.

FIG. 15 illustrates an exemplary communication system 1500 where one or more femto nodes are deployed within a network environment. Specifically, the system 1500 includes multiple femto nodes 1510A and 1510B (e.g., femtocell nodes or H(e)NB) installed in a relatively small scale network environment (e.g., in one or more user residences 1530). Each femto node 1510 can be coupled to a wide area network 1540 (e.g., the Internet) and a mobile operator core network 1550 via a digital subscriber line (DSL) router, a cable modem, a wireless link, or other connectivity means (not shown). As will be discussed below, each femto node 1510 can be configured to serve associated access terminals 1520 (e.g., access terminal 1520A) and, optionally, alien access terminals 1520 (e.g., access terminal 1520B). In other words, access to femto nodes 1510 can be restricted such that a given access terminal 1520 can be served by a set of designated (e.g., home) femto node(s) 1510 but may not be served by any non-designated femto nodes 1510 (e.g., a neighbor's femto node).

Figure 16:
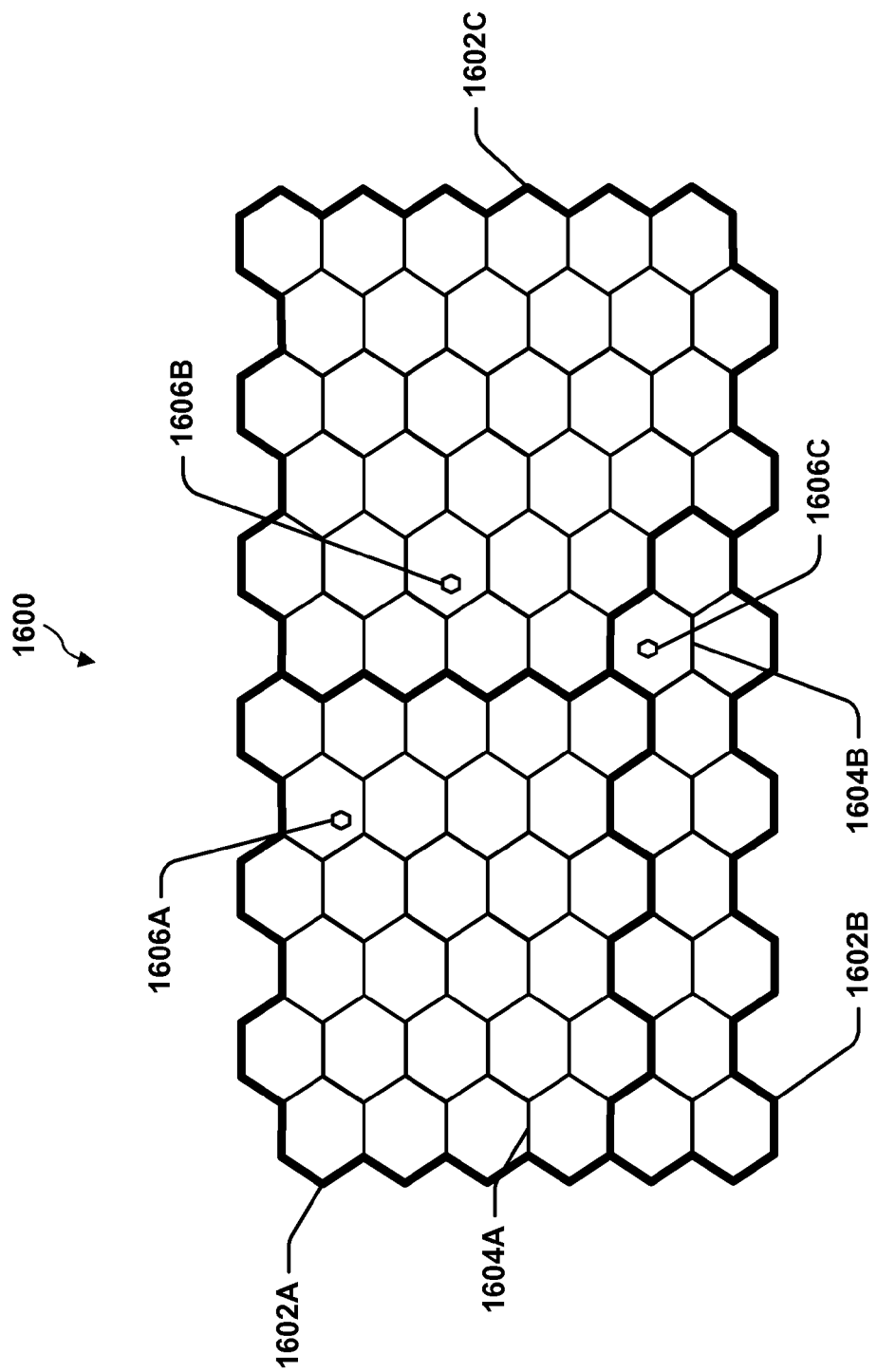
FIG. 16 illustrates an example of a coverage map having several defined tracking areas.

FIG. 16 illustrates an example of a coverage map 1600 where several tracking areas 1602 (or routing areas or location areas) are defined, each of which includes several macro coverage areas 1604. Here, areas of coverage associated with tracking areas 1602A, 1602B, and 1602C are delineated by the wide lines and the macro coverage areas 1604 are represented by the hexagons. The tracking areas 1602 also include femto coverage areas 1606. In this example, each of the femto coverage areas 1606 (e.g., femto coverage area 1606C) is depicted within a macro coverage area 1604 (e.g., macro coverage area 1604B). It should be appreciated, however, that a femto coverage area 1606 may not lie entirely within a macro coverage area 1604. In practice, a large number of femto coverage areas 1606 can be defined with a given tracking area 1602 or macro coverage area 1604. Also, one or more pico coverage areas (not shown) can be defined within a given tracking area 1602 or macro coverage area 1604.

Referring again to FIG. 15, the owner of a femto node 1510 can subscribe to mobile service, such as, for example, 3G mobile service, offered through the mobile operator core network 1550. In addition, an access terminal 1520 can be capable of operating both in macro environments and in smaller scale (e.g., residential) network environments. Thus, for example, depending on the current location of the access terminal 1520, the access terminal 1520 can be served by an access node 1560 or by any one of a set of femto nodes 1510 (e.g., the femto nodes 1510A and 1510B that reside within a corresponding user residence 1530). For example, when a subscriber is outside his home, he is served by a standard macro cell access node (e.g., node 1560) and when the subscriber is at home, he is served by a femto node (e.g., node 1510A). Here, it should be appreciated that a femto node 1510 can be backward compatible with existing access terminals 1520.

A femto node 1510 can be deployed on a single frequency or, in the alternative, on multiple frequencies. Depending on the particular configuration, the single frequency or one or more of the multiple frequencies can overlap with one or more frequencies used by a macro cell access node (e.g., node 1560). In some aspects, an access terminal 1520 can be configured to connect to a preferred femto node (e.g., the home femto node of the access terminal 1520) whenever such connectivity is possible. For example, whenever the access terminal 1520 is within the user's residence 1530, it can communicate with the home femto node 1510.

In some aspects, if the access terminal 1520 operates within the mobile operator core network 1550 but is not residing on its most preferred network (e.g., as defined in a preferred roaming list), the access terminal 1520 can continue to search for the most preferred network (e.g., femto node 1510) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1520 can limit the search for specific band and channel. For example, the search for the most preferred system can be repeated periodically. Upon discovery of a preferred femto node, such as femto node 1510, the access terminal 1520 selects the femto node 1510 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1510 that reside within the corresponding user residence 1530). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on (e.g., the access terminal is a non-member), except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for operating a low power base station in a wireless network, comprising:
   determining a timing for measuring, by the low power base station, a received signal quality of at least one other base station in the wireless network, the timing being determined periodically after the low power base station has been deployed;
   measuring the received signal quality based on the timing; and
   determining, by the low power base station, whether to communicate in the wireless network based in part on comparing the received signal quality to a threshold signal quality.

2. The method of claim 1, wherein the timing corresponds to a timing offset following initialization of a calibration period during which a plurality of low power base stations refrains from communicating in the wireless network.

3. The method of claim 1, wherein the determining the timing comprises receiving the timing from a centralized entity.

4. The method of claim 1, wherein the determining the timing comprises computing the timing as a random function.

5. The method of claim 1, wherein the determining the timing comprises computing the timing as a pseudorandom function based on a low power base station identifier.

6. The method of claim 1, wherein the determining the timing comprises shifting a previous timing to determine the timing.

7. The method of claim 1, wherein the determining the timing is based on one or more parameters of other low power base stations.

8. The method of claim 7, wherein the one or more parameters comprise an indication from the other low power base stations of other timings used by the other low power base stations to measure received signal quality.

9. The method of claim 8, further comprising receiving the indication from the other low power base stations over the air or over a backhaul.

10. The method of claim 7, further comprising determining a number of transmission opportunities over a period of time, wherein the one or more parameters comprise other transmission opportunities of the other low power base stations over the period of time, and the determining the timing is based on comparing the number of transmission opportunities to the other transmission opportunities.

11. The method of claim 1, wherein the determining whether to communicate in the wireless network comprises determining a transmit power for communicating in the wireless network based in part on comparing the received signal quality to the threshold signal quality.

12. The method of claim 1, wherein the determining whether to communicate in the wireless network comprises determining to refrain from transmitting when the received signal quality is over the threshold signal quality.

13. An apparatus for operating a low power base station in a wireless network, comprising:
   at least one processor configured to:
      determine a timing for measuring, by the low power base station, a received signal quality of at least one other base station in the wireless network, the timing being determined periodically after the low power base station has been deployed;
      measure the received signal quality based on the timing; and
      determine by the low power base station whether to communicate in the wireless network based in part on comparing the received signal quality to a threshold signal quality; and
   a memory coupled to the at least one processor.

14. The apparatus of claim 13, wherein the timing corresponds to a timing offset following initialization of a calibration period during which a plurality of low power base stations refrains from communicating in the wireless network.

15. The apparatus of claim 13, wherein the at least one processor determines the timing based on the timing received from a centralized entity.

16. The apparatus of claim 13, wherein the at least one processor determines the timing based on computing the timing as a random function or as a pseudorandom function based on a low power base station identifier.

17. The apparatus of claim 13, wherein the at least one processor determines the timing based on shifting a previous timing.

18. An apparatus for operating a low power base station in a wireless network, comprising:
   means for determining a timing for measuring, by the low power base station, a received signal quality of at least one other base station at the low power base station in the wireless network and measuring the received signal quality based on the timing, the timing being determined periodically after the low power base station has been deployed; and means for determining, at the low power base station, whether to communicate in the wireless network based in part on comparing the received signal quality to a threshold signal quality.

19. The apparatus of claim 18, wherein the timing corresponds to a timing offset following initialization of a calibration period where a plurality of low power base stations refrains from communicating in the wireless network.

20. The apparatus of claim 18, wherein the means for determining the timing determines the timing based on the timing received from a centralized entity.

21. The apparatus of claim 18, wherein the means for determining the timing determines the timing based on computing the timing as a random function or as a pseudorandom function based on a low power base station identifier.

22. The apparatus of claim 18, wherein the means for determining the timing determines the timing based on shifting a previous timing.

23. A computer program product for operating a low power base station in a wireless network, comprising:

a non-transitory computer-readable medium, comprising:

code for causing at least one computer to determine a timing for measuring, by the low power base station, a received signal quality of at least one other base station in the wireless network, the timing being determined periodically after the low power base station has been deployed;

code for causing the at least one computer to measure the received signal quality based on the timing; and code for causing the at least one computer to determine, at the low power base station, whether to communicate in the wireless network based in part on comparing the received signal quality to a threshold signal quality.

24. The computer program product of claim 23, wherein the timing corresponds to a timing offset following initialization of a calibration period where a plurality of low power base station refrains from communicating in the wireless network.

25. The computer program product of claim 23, wherein the code for causing the at least one computer to determine the timing determines the timing based on the timing received from a centralized entity.

26. The computer program product of claim 23, wherein the code for causing the at least one computer to determine the timing determines the timing based on computing the timing as a random function or as a pseudorandom function based on a low power base station identifier.

27. The computer program product of claim 23, wherein the code for causing the at least one computer to determine the timing determines the timing based on shifting a previous timing.

28. An apparatus for operating a low power base station in a wireless network, comprising:

a parameter measuring component for determining a timing for measuring, by the low power base station, a received signal quality of at least one other base station in the wireless network and measuring the received signal quality based on the timing, the timing being determined periodically after the low power base station has been deployed; and a transmit determining component for determining at the low power base station whether to communicate in the wireless network based in part on comparing the received signal quality to a threshold signal quality.

29. The apparatus of claim 28, wherein the timing corresponds to a timing offset following initialization of a calibration period where a plurality of low power base stations refrains from communicating in the wireless network.

30. The apparatus of claim 28, further comprising a transmit parameter receiving component for receiving the timing from a centralized entity.

31. The apparatus of claim 28, wherein the parameter measuring component determines the timing based on computing the timing as a random function.

32. The apparatus of claim 28, wherein the parameter measuring component determines the timing based on computing the timing as a pseudorandom function based on a low power base station identifier.

33. The apparatus of claim 28, wherein the parameter measuring component determines the timing based on shifting a previous timing.

34. The apparatus of claim 28, wherein the parameter measuring component determines the timing based on one or more parameters of other low power base station.

35. The apparatus of claim 34, wherein the one or more parameters comprise an indication from the other low power base stations of other timings used by the other low power base stations to measure received signal quality.

36. The apparatus of claim 35, wherein the parameter measuring component receives the indication from the other low power base stations over the air or over a backhaul.

37. The apparatus of claim 34, wherein the parameter measuring component determines a number of transmission opportunities over a period of time, the one or more parameters comprise other transmission opportunities of the other low power base stations over the period of time, and determines the timing based on comparing the number of transmission opportunities to the other transmission opportunities.

38. The apparatus of claim 28, wherein the transmit determining component determines whether to communicate in the wireless network based on determining a transmit power for communicating in the wireless network based in part on comparing the received signal quality to the threshold signal quality.

39. The apparatus of claim 28, wherein the transmit determining component determines to refrain from transmitting when the received signal quality is over the threshold signal quality.

* * * * *